(12) United States Patent
Prager

(10) Patent No.: US 11,962,702 B2
(45) Date of Patent: Apr. 16, 2024

(54) BIOMETRIC SENSOR

(71) Applicant: Howard Prager, Colorado Springs, CO (US)

(72) Inventor: Howard Prager, Colorado Springs, CO (US)

(73) Assignee: REAL IZvest llc, Colorado Springs, CO (US)

( * ) Notice: Subject to any disclaimer, the term of this patent is extended or adjusted under 35 U.S.C. 154(b) by 436 days.

(21) Appl. No.: 16/488,566

(22) PCT Filed: Feb. 22, 2018

(86) PCT No.: PCT/US2018/019255
§ 371 (c)(1),
(2) Date: Aug. 23, 2019

(87) PCT Pub. No.: WO2018/156782
PCT Pub. Date: Aug. 30, 2018

(65) Prior Publication Data
US 2021/0144008 A1 May 13, 2021

Related U.S. Application Data

(60) Provisional application No. 62/463,115, filed on Feb. 24, 2017.

(51) Int. Cl.
*H04L 29/06* (2006.01)
*G06V 40/12* (2022.01)
*G08B 21/18* (2006.01)
(Continued)

(52) U.S. Cl.
CPC ........ *H04L 9/3231* (2013.01); *G06V 40/1365* (2022.01); *G06V 40/1382* (2022.01);
(Continued)

(58) Field of Classification Search
CPC ..... H04L 9/3231; H04L 9/3213; H04L 67/02; G06F 21/32
See application file for complete search history.

(56) References Cited

U.S. PATENT DOCUMENTS 4,353,056 A 10/1982 Tsikos
9,654,469 B1 * 5/2017 Yang ........................ H04L 67/02
(Continued)

FOREIGN PATENT DOCUMENTS

CN 114529953 A * 5/2022 ........... G06K 9/0004
TW 201631512 A 9/2016

OTHER PUBLICATIONS

Shi et al., "InfoShield: a security architecture for protecting information usage in memory", IEEE Symposium on High-Performance Computer Architecture, Feb. 11-15, 2006.*
(Continued)

*Primary Examiner* — Morshed Mehedi
(74) *Attorney, Agent, or Firm* — Lee & Hayes P.C.

(57) ABSTRACT

A biometric identification device may be used to secure passwords and other valuable information. In one implementation, the biometric identification device may be a capacitive fingerprint sensor. Capacitive readings may be used to identify the ridges and valleys of a fingerprint and determine if an object contacting the fingerprint sensor is living tissue. Two-factor identification may be implemented by recognizing the authenticity of biometric inputs and a specific combination or sequence in which the biometric inputs are provided. A user interface is provided in which sequences of biometric inputs are associated with commands. A user may indicate a command by providing a predetermined sequence of fingerprints to a fingerprint scanner.

20 Claims, 8 Drawing Sheets

(51) Int. Cl.
*H04L 9/32* (2006.01)
*H04L 67/02* (2022.01)

(52) U.S. Cl.
CPC ............ *G08B 21/18* (2013.01); *H04L 9/3213* (2013.01); *H04L 67/02* (2013.01)

(56) References Cited

U.S. PATENT DOCUMENTS

| | | | | |
|---|---|---|---|---|
| 2008/0019578 | A1* | 1/2008 | Saito | G06K 19/07 382/115 |
| 2014/0101434 | A1* | 4/2014 | Senthurpandi | G06F 21/32 713/150 |
| 2014/0109223 | A1* | 4/2014 | Jin | H04L 63/1408 726/23 |
| 2015/0379250 | A1* | 12/2015 | Saito | G07C 9/257 726/7 |
| 2016/0321657 | A1* | 11/2016 | Loomis | G06Q 20/40145 |
| 2017/0048238 | A1* | 2/2017 | Saito | H04L 63/0861 |
| 2017/0053153 | A1* | 2/2017 | Homer | G06V 40/13 |
| 2017/0085563 | A1* | 3/2017 | Royyuru | G06Q 20/12 |

OTHER PUBLICATIONS

Barghuthi, et al., "Jibrel Network," https://jibrel.network/whitepaper, published May 2017, 8 pages.
Injestech.com, "Injes," www.injestech.com, acquired Jan. 22, 2018, 2 pages.
Shanghai A Win Technology Co., LTD, www.hsnet.com.cn, acquired Jan. 21, 2018, 24 pages.
Novetta, "Spoofing Capacitive Fingerprint Sensors," published Oct. 2015, https://www.novetta.com/whitepapers/, 8 pages.
PCT Invitation to Pay Additional Fees dated Apr. 24, 2018 for PCT Application No. PCT/US18/19255, 2 pages.
The PCT Search Report and Written Opinion dated Jun. 25, 2018, for PCT Application No. PCT/US18/19255, 11 pages.
Soutar, et al., "Biometric Encription (TM)," Chapter 22 ICSA Guide to Cryptography, McGraw-Hill (1999), 28 pages.
Takamatsu, "Resistance and Capacitance of Human Skin in Transient and Constant States," The Nippon Dental University, School of Dentistry, at Tokyo, Department of Physiology, vol. 7, Jul. 1989, 12 pages.
Taiwanese Office Action dated Jul. 7, 2023 for Taiwanese Patent Application No. 107106252, a foreign counterpart to U.S. Appl. No. 16/488,566, 8 pages.
Translation of Tawainese Office Action dated Aug. 18, 2021 for Tawainese Patent Application No. 107106252, a foreign counterpart to U.S. Appl. No. 16/488,566, 14 pages.

* cited by examiner

BIOMETRIC SENSOR

CROSS-REFERENCE TO RELATED APPLICATION

This application is a 371 National Phase Application from PCT Application No. PCT/US18/19255, filed Feb. 22, 2018, entitled "Biometric Sensor," which claims the benefit of U.S. Provisional Patent Application Ser. No. 62/463,115 filed on Feb. 24, 2017, entitled "Intelligent Thumbdrive and Holster Solution," which applications ares expressly incorporated herein by reference in itstheir entirety.

BACKGROUND

Biometric sensors are used to confirm a user's identity. There are many types of biometric sensors such as fingerprint scanners, palm print scanners, iris scanners, etc. Known problems with biometric sensors include the inability to distinguish between identical twins with identical biometric characteristics and susceptibility to "spoofing" such as by using a copy of a fingerprint to fool a fingerprint scanner.

Reliably confirming user identity in a way that is more robust than standard passwords will become increasingly important in transactions and agreements that are not managed by a central authority such as, for example, cryptocurrency and smart contracts encoded in a blockchain. Using biometric-based identity to validate users in such types of interactions will increase accountability and confidence in blockchain or other peer-to-peer systems.

Hacking of networks that include sensitive personal or financial data has also become a pervasive problem. Systems for limiting access to networks to only identified users can serve to exclude hackers and increase the security of a network, website, etc. by preventing access by unknown or unauthorized users.

SUMMARY

This Summary is provided to introduce a selection of concepts in a simplified form that are further described below in the Detailed Description. This Summary is not intended to identify key features or essential features of the claimed subject matter nor is it intended to be used to limit the scope of the claimed subject matter.

An illustrative biometric sensor may be integrated into a portable device having a form factor, for example, similar to security token, a thumb drive, a dongle, a key fob, etc. The biometric sensor may be implemented as a fingerprint sensor that uses optical, capacitive, or other technology to sense the landscape of ridges and valleys on a fingerprint. The biometric sensor may include encrypted memory that stores values such as alphanumeric password strings, credit card numbers, bank account numbers, etc. In an illustrative usage scenario, the biometric sensor may be communicatively connected to a computing device and receive a character string from the computing device such as, for example a universal resource locator (URL) of a website currently displayed on the computing device. In response to receiving an authorized biometric input such as a fingerprint, the biometric sensor may decrypt an encrypted password associated with the URL and provide the password to a web browser on the computing device. A device used to implement this technique may be referred to, for example, as a "smart password thumb drive."

A biometric sensor that may be similar or different than the smart password thumb drive can be used to provide two-factor identification by recognizing multiple biometric inputs and a specific sequence of those inputs. For example, if the biometric inputs are fingerprints, a technique for providing two-factor biometric identification may include receiving a first fingerprint and a second fingerprint then comparing each fingerprint to stored data to determine if the sensed fingerprints match the stored data associated with authorized fingerprints. The order in which the two fingerprints are provided to the biometric sensor is the second factor that is used to generate a command or unlock a functionality. By way of example, if a user were to touch his right index finger followed by his left thumb to the biometric sensor, the two-factor identification would determine that the fingerprints of the right index finger and of the left thumb match the saved fingerprint data for the user and that a predefined temporal order for a given command specifies that the right index finger is first and the left thumb second. Thus, an identical twin or nefarious user that had copies of the fingerprints would still need to know the order in which the fingerprints are presented in order to generate the command or unlock the functionality.

Features of the devices and systems disclosed herein may be implemented in the biometric sensor itself and/or in another computing device such as a server or other physically remote system. Such systems may provide a user interface (UI) with links to multiple different service providers such as banks, credit cards, cryptocurrency accounts, etc. in which the individual links are associated with specific combinations of fingerprint patterns. Thus, for example, left ring finger followed by left index finger may access the link to the user's bank account. The temporal order of the fingerprints that are detected by the biometric sensor may be part of the identifying combination. Thus, continuing with the previous example, using the same fingers in a different order (i.e., left index finger followed by left ring finger) does not access the user's bank account but may access a different account.

The fingerprint patterns used to access such a link may be encrypted during transmission between the biometric sensor and a separate computing device. The computing device which receives the encrypted fingerprint patterns may use a fingerprint encryption/decryption module to unencrypt the transmitted signals and generate unencrypted fingerprint patterns. The computing device receiving the fingerprint patterns may have access to saved fingerprint patterns in a master fingerprint record or other data store and can use a biometric authorization module to compare the unencrypted fingerprint patterns with the stored patterns in order to determine if there is a match. A command to access one of the links may be generated based on a determination that the fingerprints match authorized fingerprints and the order in which the biometric sensor detected the fingerprint patterns.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
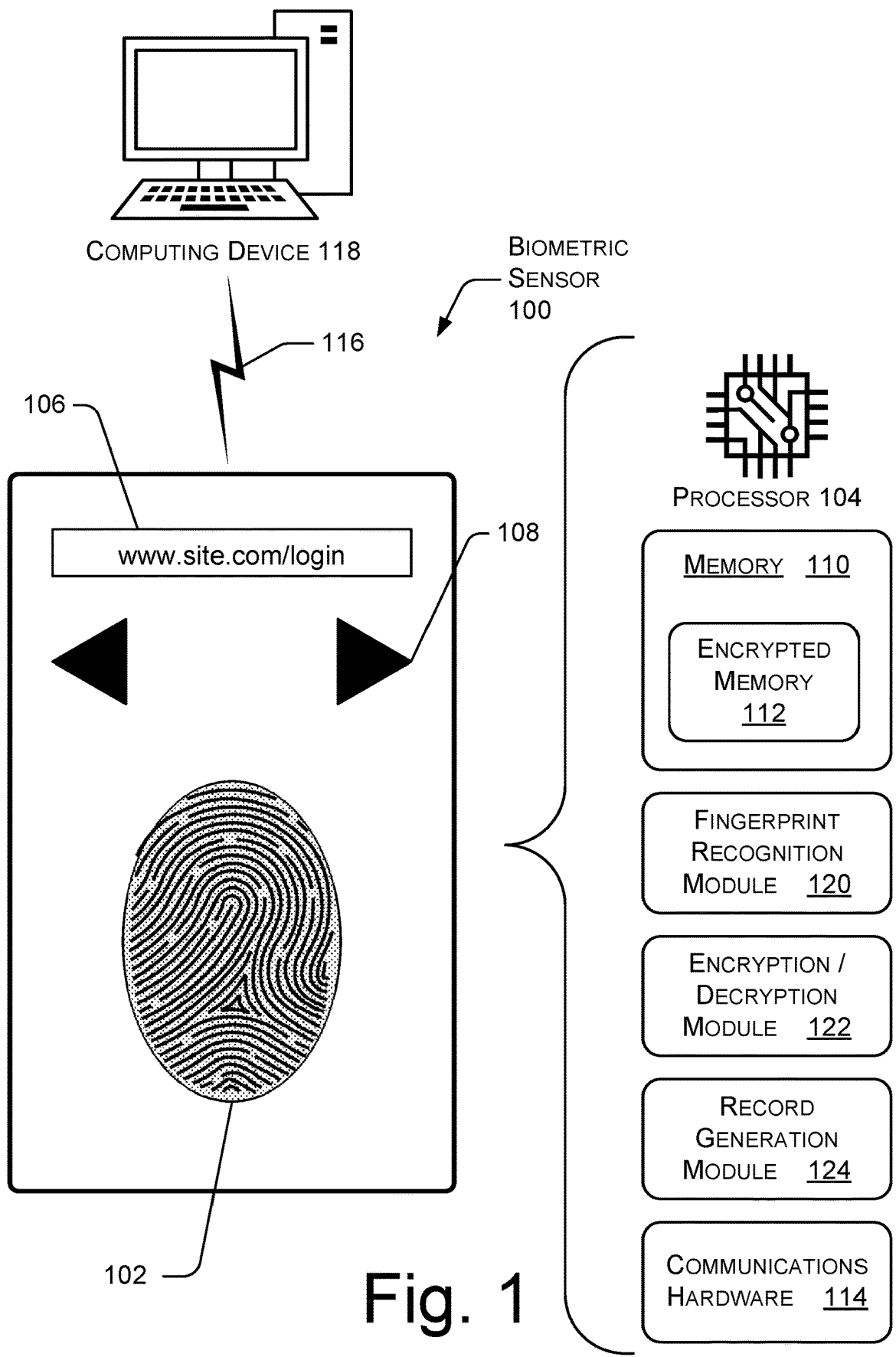
FIG. 1 is a schematic diagram of an illustrative biometric sensor.

FIG. 1 is a schematic diagram of a biometric sensor 100. The biometric sensor may be implemented as any type of biometric sensor such as a fingerprint scanner, a retina scanner, a palm print scanner, etc. In an implementation, biometric sensor 100 includes a sensing pad 102 for detecting a fingerprint. There are multiple different technologies that may be used to sense fingerprints including optical, capacitive, and ultrasound.

Fingerprint sensing may detect a pattern of ridges and valleys on human skin that correspond to the portion of a fingerprint in contact with the sensing pad 102. A signal generated by the sensing pad 102 may include a landscape of points each associated with a location on the sensing pad 102 (e.g., x- and y-values) any detected values such as light or capacitance. This generates a landscape of points which is representative of a fingerprint. A sensor with sufficient resolution will also read capacitance at points within and on the sides of each of the valleys of a fingerprint. A specific subset of the total number of detected points may be used to represent the landscape in a way that captures the most unique aspects of the landscape and/or reduces the amount of data needed to store a representation of the fingerprint. For example, a predetermined path through the landscape points may be used to identify a subset of points that are then taken as representative of the fingerprint.

A capacitive fingerprint sensor may be made up of one or more semiconductor chips containing an array of tiny cells. Each cell includes two conductor plates, covered with an insulating layer. The cells are smaller than the width of one ridge on a fingerprint. The capacitive fingerprint sensor may be connected to an integrator, an electrical circuit built around an inverting operational amplifier. The inverting amplifier is a complex semiconductor device, made up of a number of transistors, resistors, and capacitors. The inverting amplifier alters a supply voltage. The alteration is based on the relative voltage of two inputs, called the inverting terminal and the non-inverting terminal. In this case, the non-inverting terminal is connected to ground, and the inverting terminal is connected to a reference voltage supply and a feedback loop. The feedback loop, which is also connected to the amplifier output, includes the two conductor plates. The surface of the finger acts as a third capacitor plate, separated by the insulating layers in the cell structure and, in the case of the fingerprint valleys, a pocket of air. Varying the distance between the capacitor plates (by moving the finger closer or farther away from the conducting plates) changes the total capacitance (ability to store charge) of the capacitor. Because of this quality, the capacitor in a cell under a ridge will have a greater capacitance than the capacitor in a cell under a valley.

To scan the finger, a processor 104 of the biometric sensor 100 first closes the reset switch for each cell, which shorts each amplifier's input and output to "balance" the integrator circuit. When the switch is opened again, and the processor 104 applies a fixed charge to the integrator circuit, the capacitors charge up. The capacitance of the feedback loop's capacitor affects the voltage at the amplifier's input, which affects the amplifier's output. Since the distance to the finger alters capacitance, a finger ridge will result in a different voltage output than a finger valley. The processor 104 reads this voltage output and determines whether it is characteristic of a ridge or a valley. By reading many cells in the sensor array, the processor 104 can put together an overall picture of the fingerprint—a landscape.

One example of a capacitive fingerprint sensor is the JP2380 Sensor Module available from JP Sensor Corp. Ltd. Guangdong, China. Another example of a capacitive fingerprint sensor is the INJES FRT1012 thumbprint reader available from INJES Technology Co., Ltd. Shenzhen, China.

In implementations, the biometric sensor 100 may include two or more sensing pads 102. Multiple sensing pads 102 may increase security by allowing detection and confirmation of two different fingerprint simultaneously and may allow for a more convenient user interface in which the user can use one sensing pad 102 for the fingers of the left hand and another sensing pad 102 for the fingers of the right hand. In one example, the biometric sensor 100 could include 10 separate sensing pads 102 so that there is one sensing pad 102 for each of the user's 10 fingers.

Capacitive sensing may be used to distinguish between a fingerprint generated by living tissue and a fingerprint generated by non-living tissue or three-dimensional copy of a fingerprint. For example, one technique for identifying resistance and capacitance of human skin is described in Keizou Takamatsu, *Resistance and Capacitance of the Human Scan at the Transient and Instant Condition Applied by the Finite Alternating Potential*, Shigaku 76(7): 1412-1423, 1989. Application of a finite alternating current to the living body can generate resistance in capacitance values from changes in the amplitude and phase angle the passing potential. With this method resistance and capacitance can be measured for both transient and constant states that each frequency applied to the living body. A sensing pad 102 configured to apply a finite alternating current to a fingertip, using for example the techniques described by Takamatsu, may detect whether the response of the object contacting the sensing pad 102 behaves in a matter consistent with that of living tissue. Furthermore, the effect of temperature and/or humidity on capacitance value differences between the ridges, valleys, and sides of the valleys of a fingerprint landscape may be used to identify capacitance readings that exhibit the characteristics of living tissue. For example, lower temperature on the ridges of fingerprints and relatively higher temperature in the valleys is a characteristic of living tissue that may be absent in a synthetic replica of a fingerprint. Thus, known characteristics of living tissue based on differences in humidity and/or temperature between ridges and valleys of fingerprints may be used to determine if fingerprint readings on the sensing pad 102 were generated by living tissue Additionally, any of the above techniques for discriminating between living tissue and non-living tissue may be trained using a machine learning technique such as a classifier and training data set consisting of actual fingerprints from live people and synthetic copies of fingerprints made from wax, latex, or other material. Thus, by providing appropriate training data to a machine learning classifier, a computer system can learn how to classify capacitance readings into those associated with living tissue and those not associated with living tissue. Machine learning techniques for training a computer system to classify a new input into one of multiple categories are well known to an ordinarily skilled artisan. Additional details regarding the techniques described in Takamatsu are included below in Appendix A. A person having ordinary skill in the art will understand how to adapt hardware and software describe herein to implement the techniques from Appendix A.

The biometric sensor 100 may be implemented as a handheld or portable device that can be moved conveniently with the user. In one implementation, the biometric sensor 100 may include a display 106 capable of displaying text such as ASCII characters. The display may be implemented as a liquid crystal display, electronic paper display, a light-emitting diode (LED) display, or other display technology. The biometric sensor 100 may also include an input device 108 such as one or more buttons, a switch, a scroll wheel, etc. when used for the input device 108 may be to change the information displayed on the display 106 which in turn may change the data transmitted from the biometric sensor 100 to other devices. The biometric sensor 100 may include a power source such as a battery.

The biometric sensor 100 itself may be a computing device that includes the processor 104 and memory 110. The memory 110 may include encrypted memory 112. The encrypted memory 112 may be used to store sensitive data such as passwords, credit card numbers, bank account numbers, hashes for accessing cryptocurrency accounts, and the like. Each encrypted value stored in the encrypted memory 112 may be associated with a character string such as the URL of a website for which a password is used or the name of a bank that issued a credit card. Thus, a "name" for an encrypted value may be displayed in the display 106. The display 106 does not display the password or credit card number itself, but rather displays information such as a "name" that will allow a user to identify which password, credit card number, etc. is currently available for access from the biometric sensor 100.

The biometric sensor 100 may also include communications hardware 114 for establishing a communicative connection 116 with an external computing device 118. The communications hardware 114 may be a modem configured to generate radio or electronic signals such as those used for any known wireless communications techniques including Bluetooth, Wi-Fi (e.g., IEEE 802.11), cellular data, or near field communication (e.g., Ecma-340, ISO/IEC 18092). The communications hardware 114 may additionally or alternatively provide a port, plug, socket etc. for implementing a wired connection using any known type of cable or connection technique for computing devices such as a universal serial bus (USB) cable, a FireWire cable, a headphone cable, a telephone cable, etc. Thus, the communicative connection 116 may be a wired or wireless connection. The computing device 118 may be implemented as any type of computing device such as a desktop computer, laptop computer, tablet computer, smart phone, personal digital assistant, etc.

A fingerprint recognition module 120 may be included in the biometric sensor 100. The fingerprint recognition module 120 may compare a signal generated by the sensing pad 102 to data stored on the biometric sensor 100. For example, data generated from fingerprint scans known to be of the authorized user may be stored in the encrypted memory 112. The stored data may be the series of values that represents the landscape of a scanned fingerprint or some subset of that such as the values corresponding to a predetermined path through the multiple points that make up the landscape. The fingerprint recognition module 120 may use any known or yet-to-be-developed technique for determining whether a fingerprint sensed by the sensing pad 102 matches an authorized fingerprint. Discrimination between living tissue and non-living tissue may also be performed by the fingerprint recognition module 120 using, for example, an algorithm such as that described by Takamatsu, an algorithm developed by machine learning, or a different technique. Thus, the fingerprint recognition module 120 may determine that a given fingerprint is an authorized fingerprint and is generated by living tissue.

An encryption/decryption module 122 may control access to the encrypted memory 112 or encrypt data stored in the memory 110. Any suitable technique for encrypting data may be used to secure the encrypted memory 112. In some implementations, encryption may be provided by specialized hardware such as a secure cryptoprocessor. The secure cryptoprocessor may be implemented as a dedicated computer on a chip or microprocessor for carrying out cryptographic operations, embedded in a packaging with multiple physical security measures, which give it a degree of tamper resistance. Upon determining that a fingerprint contacting the sensing pad 102 is an authorized fingerprint, the encryption/decryption module 122 may decrypt all or part of the data stored in the encrypted memory 112.

Decryption of an encrypted value generates a value that is not encrypted. As described above this value may be a password, credit card number, a hash code, or the like. The value that is encrypted may be identified based on information displayed in the display 106. Thus, if "www.site.com/login" is displayed in the display 106, then the value may correspond to a password used to login to that website.

Correspondence between a character string, such as the website address, and a particular encrypted value may be stored in the memory 110 and/or the encrypted memory 112. For example, the encrypted memory 112 may store a lookup table of character strings and associated values such as passwords or credit card numbers. In one implementation, the non-secure information such as the "names" of a credit card or the URL of a website may be stored in the memory 110 with a pointer to a particular location in encrypted memory 112. And the corresponding location in the encrypted memory 112 stores the encrypted value such as the password or credit card number.

Thus, upon receiving a character string the encryption/decryption module 122 may decrypt the value that corresponds to that character string. Other contents of the encrypted memory 112 may remain encrypted. In one implementation, the character string used to identify the value to be unencrypted may be displayed in the display 106. A user may change the character string displayed on display 106, and thus the value that is unencrypted, by manipulation of the input device 108.

In a different implementation, the character string may be provided by the computing device 118. For example, the biometric sensor 100 may receive the character string from the computing device 118 via the communicative connection 116 based on a URL displayed in a web browser open on the computing device 118. Thus, the computing device 118 can communicate to the biometric sensor 100 a request for a password to access the website currently displayed in a web browser.

A record generation module 124 may create a record in the memory 110 and/or encrypted memory 112 of an association between a character string and a value. The record generation module 124 add new data to the biometric sensor 100 so that passwords for new websites or numbers of new credit cards may be stored. For example, if the biometric sensor 100 is in communicative connection with the computing device 118 and a website is accessed for which there is no corresponding entry in the memory 110 of the biometric sensor 100, then the URL of the website and the password manually entered by a user may be recorded by the biometric sensor 100. The record generation module 124 may then create a record that is at least partially encrypted storing the URL of the website in association with the password. Similarly, a user may enter the credit card number for new credit card and a name for the credit card on the computing device 118 and a record associate in the credit card number with the name may be created by the record generation module 124 on the biometric sensor 100. Upon subsequent access to the website, the user may provide his or her fingerprint to the biometric sensor 100 in order to decrypt and provide the appropriate password to the computing device 118 for use in logging into the website.

Figure 2:
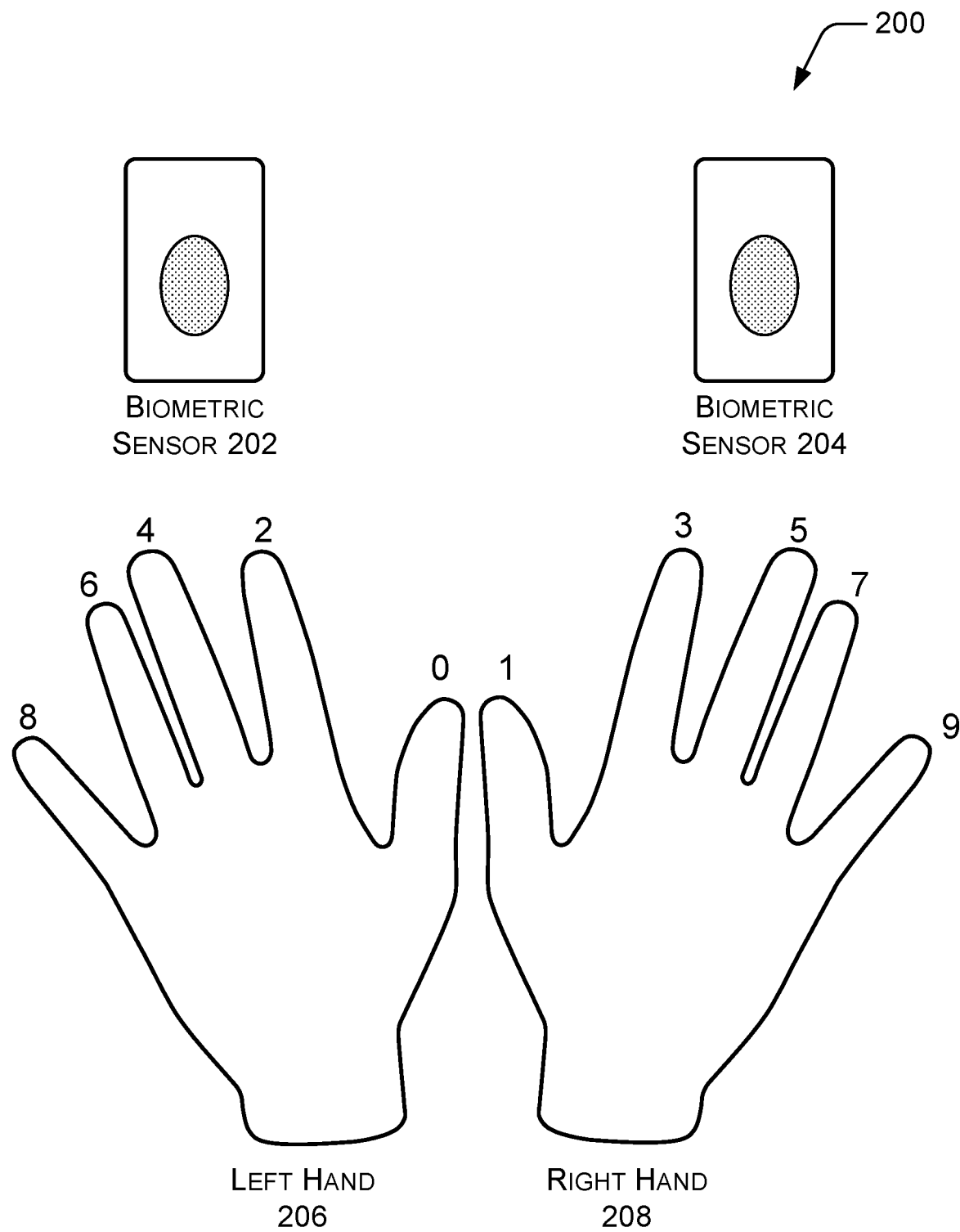
FIG. 2 shows an illustrative UI that includes numeric values assigned to the fingerprints of a user's fingers.

FIG. 2 shows a diagram 200 of an illustrative UI in which there is a first biometric sensor 202 and a second biometric sensor 204. The first biometric sensor 202 may be used primarily for reading the fingerprints of a user's left hand 206. The second biometric sensor 204 may be used primarily for reading the fingerprints of the user's right hand 208. However, as described above, similar UIs may be implemented with a greater or lesser number of biometric sensors 202/204. In this UI, each of a user's fingers, more precisely the corresponding fingerprints, may be associated with an integer from 0 to 9. The association of a particular fingerprint with an integer is arbitrary and may be user configurable. In the example shown in this diagram 200, the thumb of the left hand 206 is associated with 0 and the remaining fingers of the left hand are associated with the even integers 2, 4, 6, and 8. The fingers of the right hand 208 are associated with the odd integers 1, 3, 5, 7, and 9. Thus, specific finger combinations can be represented by numbers. For example, the number 103 represents, for this example, right thumb, left thumb, right index finger. A different user who elected to associate the integers with different fingers would use a different finger combination to represent the number 103.

This technique of representing fingers by unique integers allows for aspects of a UI such as icons displayed on a screen to be presented with a number sequence rather than a list of fingers. For example, if a user set the code for unlocking an electronic folder as a specific sequence of three different fingerprints, that code can be represented on a UI as a three-digit number rather than a verbose and less compact representation specifying which fingers to use. This shorthand technique for representing particular fingerprint entries may be particularly useful on UIs in which there is limited screen space such as mobile devices.

Additionally, because the correspondence of integers to fingers may be user configurable, knowledge of the correspondence may provide a second factor for more secure authentication. For example, if a UI indicates that entering 103 will unlock an electronic file, the user will must know which fingers correspond to the integers 1, 0, and 3 in order to provide the correct series of fingerprints. If, however, the UI instructed a user to "scan your right thumb, then your left thumb, and then your right index finger" there would be no second factor and, for example, an unauthorized user with identical fingerprints could access the electronic file.

Two-factor authentication may be provided by both the combination and order of fingerprints. In an implementation with multiple biometric sensors 202/204, a combination of fingerprints presented at the same time may be used as a second factor. For example, a particular unlock command may consist of contacting the left middle finger to the biometric sensor 202 and the right middle finger to the biometric sensor 204. Commands based on the presentation of multiple fingerprints simultaneously may be referred to as "chording." Chording may be available as a second factor on any implementations using two or more biometric sensors 202/204.

A user may designate one or more of his or her fingers as an "emergency" or "911" finger that, if detected by one of the biometric sensors 202/204 generates an alert which contacts the authorities and/or prevents access to any resources secured by the biometric sensors 202/204. For example, the user may designate the left ring finger as the "emergency" finger. If the fingerprint from that finger is detected, the system using fingerprint identification may enter an alert state. Use of an "emergency" finger provides a technique for the user to surreptitiously indicate that he or she is under duress such as, for example, while being forced to use his or her biometrics to grant access. With a UI in which multiple different fingers are required for interaction, a bad actor who does not know which finger triggers the alert state will not know if the user has used the "emergency" finger to generate an alarm. Similarly, even if the bad actor is manipulating fingers of an unconscious user or using a copy of fingerprints that is capable of fooling the biometric sensors 202/204, there will be a one in 10 chance that the bad actor uses the "emergency" finger and unintentionally alerts authorities.

Figure 3:
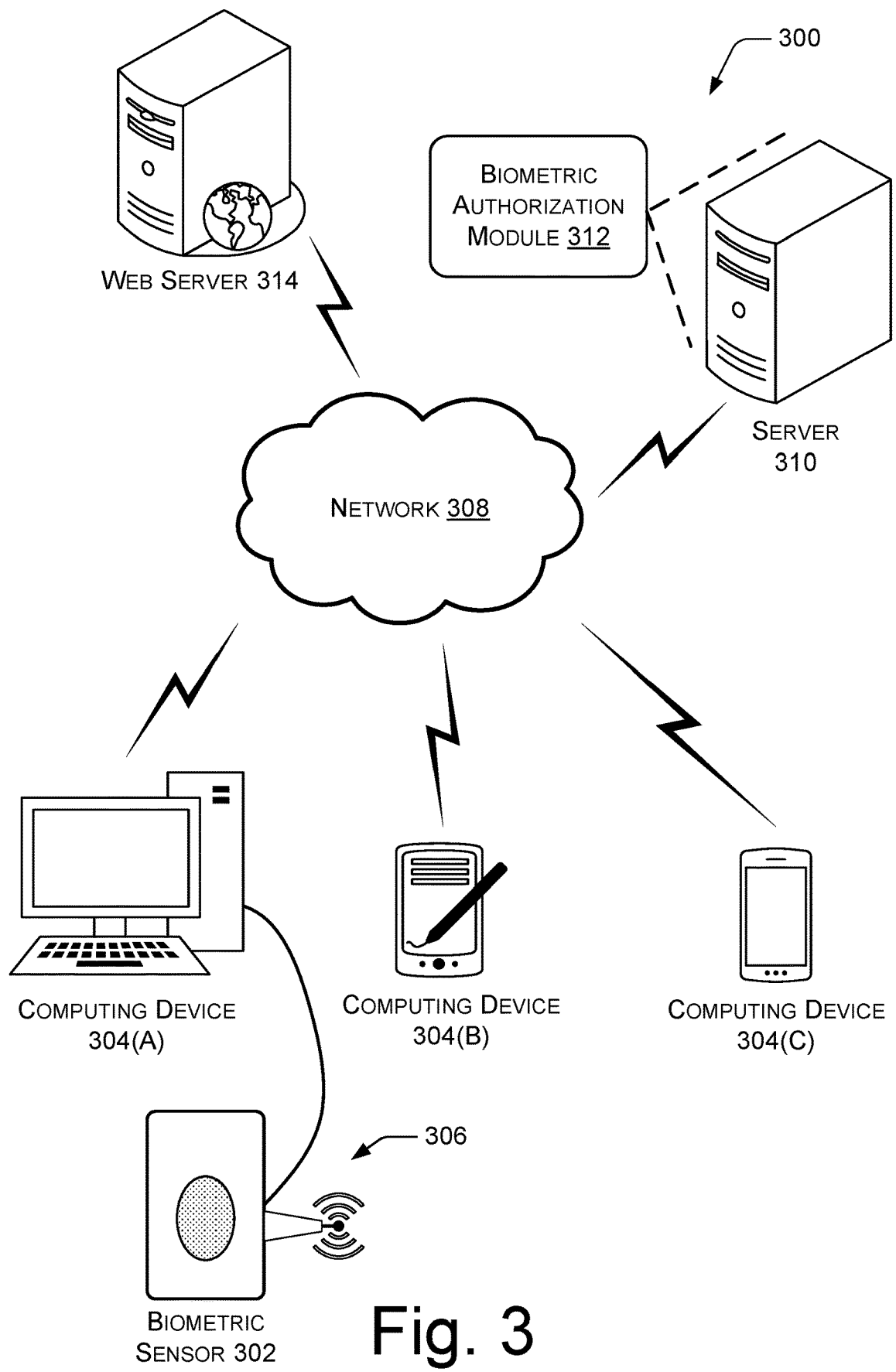
FIG. 3 is a schematic diagram of an illustrative networked environment that includes a biometric sensor.

FIG. 3 shows an illustrative networked environment 300 that includes a biometric sensor 302. The biometric sensor 302 may be the same or similar to the biometric sensor 100 introduced in FIG. 1. The biometric sensor 302 may be connected to any one of multiple different types of computing devices 304(A), 304(B), or 304(C), collectively 304, by a communicative connection 306 that may be implemented using wired or wireless technology. The biometric sensor 302 may have a portable form factor so that it can be carried by a user and connected to different computing devices 304 at different times. For example, a user may connect the biometric sensor 302 to a first computing device 304(A) when at home to provide biometric authentication and a second computing device 304(C) when away from home.

The computing devices 304 may be connected to a network 308. The network 308 represents any type of communications network such as the Internet, a wide area network (WAN), a local area network (LAN), a telephone network, a cable network, a mesh network, a peer-to-peer network and the like. The network 308 provides connection to one or more other physically remote computing devices such as a server 310 or a web server 314. The server 310 may be implemented as a single distinct physical device or may represent portions of multiple different devices that together collectively provide networked-computing functionality. Thus, the server 310 may be implemented as a plurality of servers or other computing devices distributed across one or more different physical locations. The server 310 may also represent a "cloud" computing-infrastructure and software model for enabling ubiquitous access to shared pools of configurable resources (such as computer networks, servers, storage, applications and services), which can be provisioned over the network 308. The web server 314 may provide webpages and other data to the computing device 304. For example, the web server 314 may use markup language such as Hypertext Transfer Protocol (HTTP) to serve the files that form webpages to the computing device 304 in response to requests forwarded by a web browser or other HTTP client.

The server 310 may include a biometric authorization module 312 that performs backend processing to validate or authenticate biometric data received by the biometric sensor 302. Thus, in some implementations it is hardware and software on the server 310 that determines if a detected fingerprint matches an authorized fingerprint. The server 310 may also communicate with other computing devices such as the web server 314 and provide authorization based on confirmation of biometric data received from the biometric sensor 302. For example, if the biometric authorization module 312 determines that biometric data detected by the biometric sensor 302 matches that of an authorized user, the server 310 may provide a token to the web server 314 that serves as evidence of authorized use. Placing biometric authorization functionality on the server 310 rather than on the biometric sensor 302 reduces the computational demands placed on the biometric sensor 302 which may allow for a smaller form factor or more portable device. Additionally, updating aspects of the biometric authorization techniques may be simplified if that update can be applied to a single server 310 rather than to a multitude of different biometric sensors 302.

Figure 4:
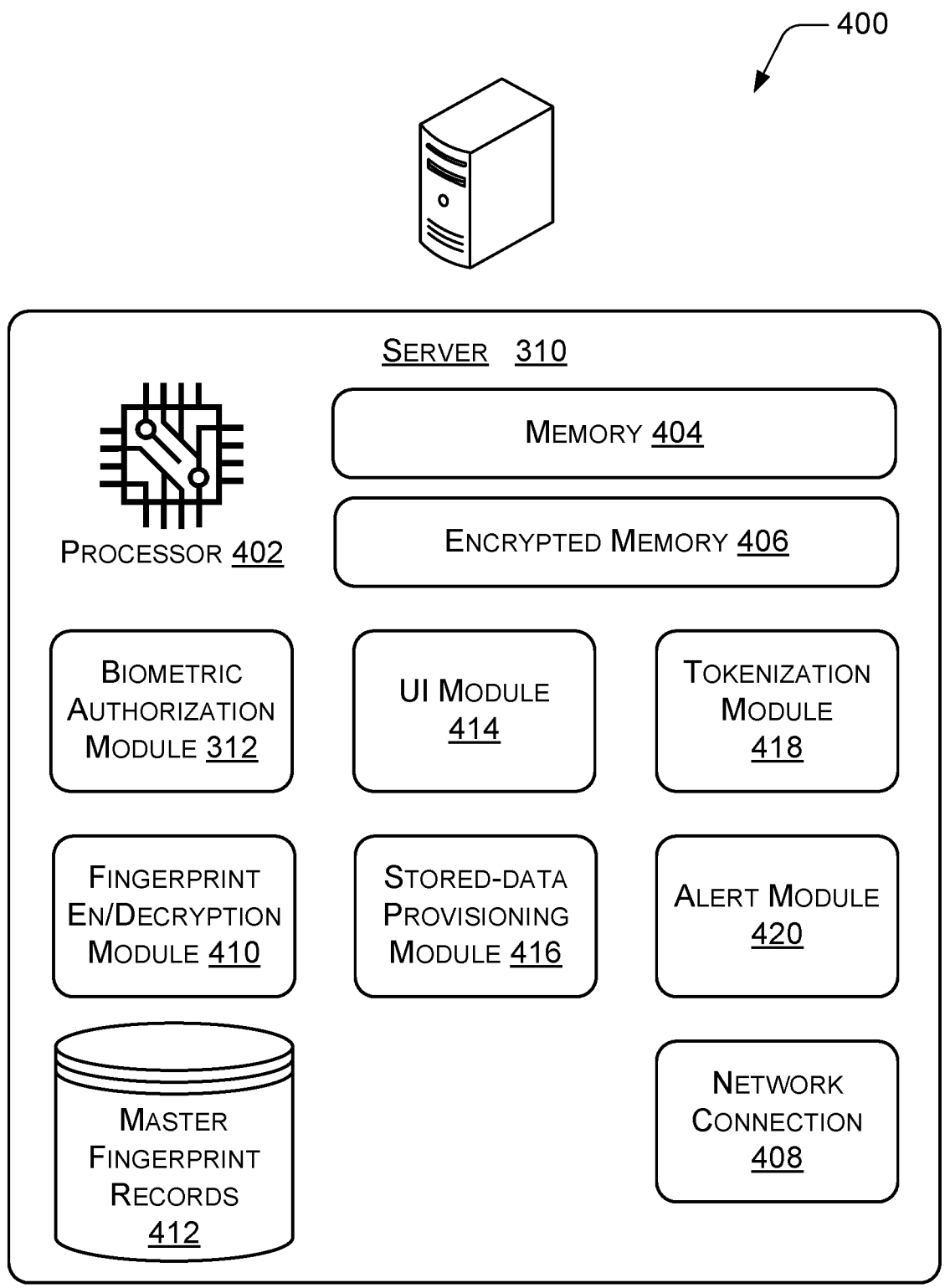
FIG. 4 is an illustrative block diagram of a server computer that processes data received from a biometric device.

FIG. 4 shows illustrative block diagram 400 of components within the server 310. Although shown in the diagram 400 together in a single grouping, it is to be understood that the various components of the server 310 may be distributed across multiple pieces of hardware and multiple physical locations. The server 310 may include one or more processors 402 and memory 404 that stores various modules, applications, programs, or other data. Individual ones of the processors 402 may be implemented as hardware processing units (e.g., a microprocessor chip) or software processing units (e.g., a virtual machine). The hardware processing units may be implemented with any suitable type of processor such as a single core processor, a multicore processor, a central processing unit (CPU), a graphical processing unit (GPU), or the like. The memory 404 may include instructions that, when executed by the one or more processors 402, cause the processors 402 to perform the operations described herein. The server 310 may also include encrypted memory 406 for storing data such as passwords, credit card numbers, and the like. The server 310 may also include a network connection 408, such as a network interface card or modem, to the network 308 or other network.

The memory 404 may comprise computer-readable media implemented in hardware or firmware. The memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store information and which can be accessed by a processor. Computer-readable media encompasses non-transitory computer-readable media. Non-transitory computer-readable media includes all types of computer-readable media other than transitory signals.

The server 310 also contains multiple modules. The modules may be implemented as software stored in the memory 404 (or elsewhere), firmware, hardware, a system-on-a-chip (SOC), mechanical computing devices, etc.

A fingerprint encryption/decryption module 410 can decrypt data representing an encrypted fingerprint pattern. A fingerprint pattern, the landscape of ridges and valleys, may be transmitted to the server 310 in an encrypted form so that interception of the transmission will not provide data that can be used to circumvent biometric security measures. Multiple different types of encryption techniques may be used to encrypt a fingerprint during transmission such as public/private key encryption or use of cryptoprocessor on both the biometric sensor and the server 310. Encryption may also be implemented by hashing the data that represents the fingerprint pattern or combining the fingerprint pattern through addition or subtraction with arbitrary data or noise.

In one implementation, fingerprints or other biometric data being sent to the server 310 may be encrypted using synthetic biometric data. The synthetic biometric data may be combined with the sensed data at the biometric sensor. Techniques for implementing the combination may include addition, subtraction, multiplication or other known techniques for combining two sets of data. Thus, the signal leaving the biometric sensor is not the raw data collected from a fingerprint scanner or other type of sensor but is data that has been obfuscated by synthetic biometric data. Without knowledge of how the sensed data was manipulated, it may be impossible to regenerate the original data from the transmission.

The synthetic biometric data used to obscure the biometric reading may have similar characteristics to the actual biometric data. But the synthetic data does not correspond to an actual biometric reading. In the case of a capacitive fingerprint scan, the synthetic biometric data may be a landscape of arbitrary capacitance values. The landscape may be generated in part by using random numbers to create a collection of capacitance values. However, the values included in synthetic biometric data may be constrained so that they are similar to values identified in actual biometric measurements. For example, capacitive scans of fingerprints may generate capacitance values that fall within a particular range of values and different parts of a scanning surface may have different ranges of values. For example, there may be higher capacitance values towards the middle of a sensor where a fingerprint makes more forceful contact and lower values or zero values at the edges if finger does not contact the sensor surface. Synthetically generated arbitrary fingerprint patterns may be designed to have similar features. One way of doing so is to combine the values from a large number of separate biometric measurements. This will create a distribution of values having a median and a standard deviation. These statistical values derived from actual measurements may be used to constrain the synthetic values such as by limiting the synthetic values to a particular subset of actual values. For example, for a given x, y, position on a landscape a randomly selected capacitance value may be restricted to only values that are within one standard deviation, two standard deviations, or three standard deviations of the median value for actual fingerprint capacitance at the same x, y, position. Thus, the synthetic biometric data may include random values but will have values that are typical for actual biometric data.

A large number of synthetic biometric data sets may be generated. For example, 1,000, 10,000, 100,000, or more different artificial landscapes of capacitance values may be generated. Copies of the synthetic biometric data may be stored on both the biometric sensor and the server 310. Each transmission of data from the biometric sensor to the server 310 may be encrypted using a different artificial landscape. The order in which the artificial landscapes are used to encrypt transmissions may be predetermined. For example, the first fingerprint scan sent to the server 310 from the biometric sensor may be encoded using the synthetically generated arbitrary fingerprint pattern #1207. Thus, upon receiving that first transmission, the fingerprint encryption/decryption module 410 will use pattern #1207 to decode the encrypted fingerprint.

The collection of synthetic biometric data present on the server 310 may be used for multiple users. However, the order in which the synthetic patterns are used may differ for each user. Thus, the synthetic biometric data used to unencrypt the $n^{th}$ transmission from a biometric sensor associated with a first user will be different than the biometric data used to unencrypt the $n^{th}$ transmission from a biometric sensor associated with a second user. Thus, both the synthetic biometric data and identity of the user are used to unencrypt a fingerprint or other biometric data sent to the server 310.

The biometric authorization module 312 compares a fingerprint pattern decrypted by the fingerprint encryption/decryption module 410 with a stored fingerprint pattern. If there is a match, the biometric authorization module 312 recognizes the fingerprint scanned by the biometric scanner as belonging to an authorized user. The biometric authorization module 312 may use any known technique for comparing fingerprint scans. The biometric authorization module 312 may also determine if a sensed fingerprint was generated by living tissue. The biometric authorization module 312 may do this using any of the techniques discussed previously such as by comparing a landscape of ridge and valley capacitance readings to a known characteristic of living tissue.

Reference fingerprints for users enrolled in the system may be stored in the master fingerprint records 412. The master fingerprint records 412 may be an encrypted database of fingerprint scans of multiple users. Fingerprint scans from all 10 fingers of a user may be stored in the master fingerprint records 412. Fingerprints from a user may be captured during an enrollment process in which the user provides fingerprint scans to the server 310. The enrollment process may also include the user providing identifying credentials to a third party that are used to link the fingerprint scans to another aspect of the user's identity. For example, a user may present documents such as a driver's license, birth certificate, passport etc. to a notary or at a government office, for example, and have his or her fingerprints captured. Thus, the name of the user and other information such as address, driver's license number, bank account number, phone number, Social Security number, etc. may be associated with the scans of his or her fingerprints and sent to the server 310.

Enrollment may also be implemented by a user providing identifying credentials to a third party and then receiving a temporary code or voucher. The user may enter the temporary code or voucher into his or her computing device and then capture his or her biometric data with an attached biometric sensor. The code or voucher will associate the captured biometric data with the information provided in the user's identifying credentials. Therefore, subsequent presentation of the user's biometric data will allow the server 310 to associate actions of that user with his or her identifying credentials.

The user may create multiple identities each associated with different identifying credentials. For example, one identity could be the user's personal identity associated with his or her actual name and home address. Another identity could be a professional identity also associated with the user' employer as well as a corporate credit card account. Anonymous identities are also possible in which the user's biometric data is associated with non-identifying credentials such as a numbered bank account, hash code for a cryptocurrency account, or another type of electronic account. The user may log into each of the different accounts by presenting different combinations of biometric data. For example, if the biometric data is fingerprints, a first sequence of fingerprints may log the user into the server 310 under a public identity associated with one or more publicly known characteristics of the user and a second, different, sequence of fingerprints may log the user into the server 310 under an anonymous identity that is not associated with publicly known characteristics of the user.

Figure 5:
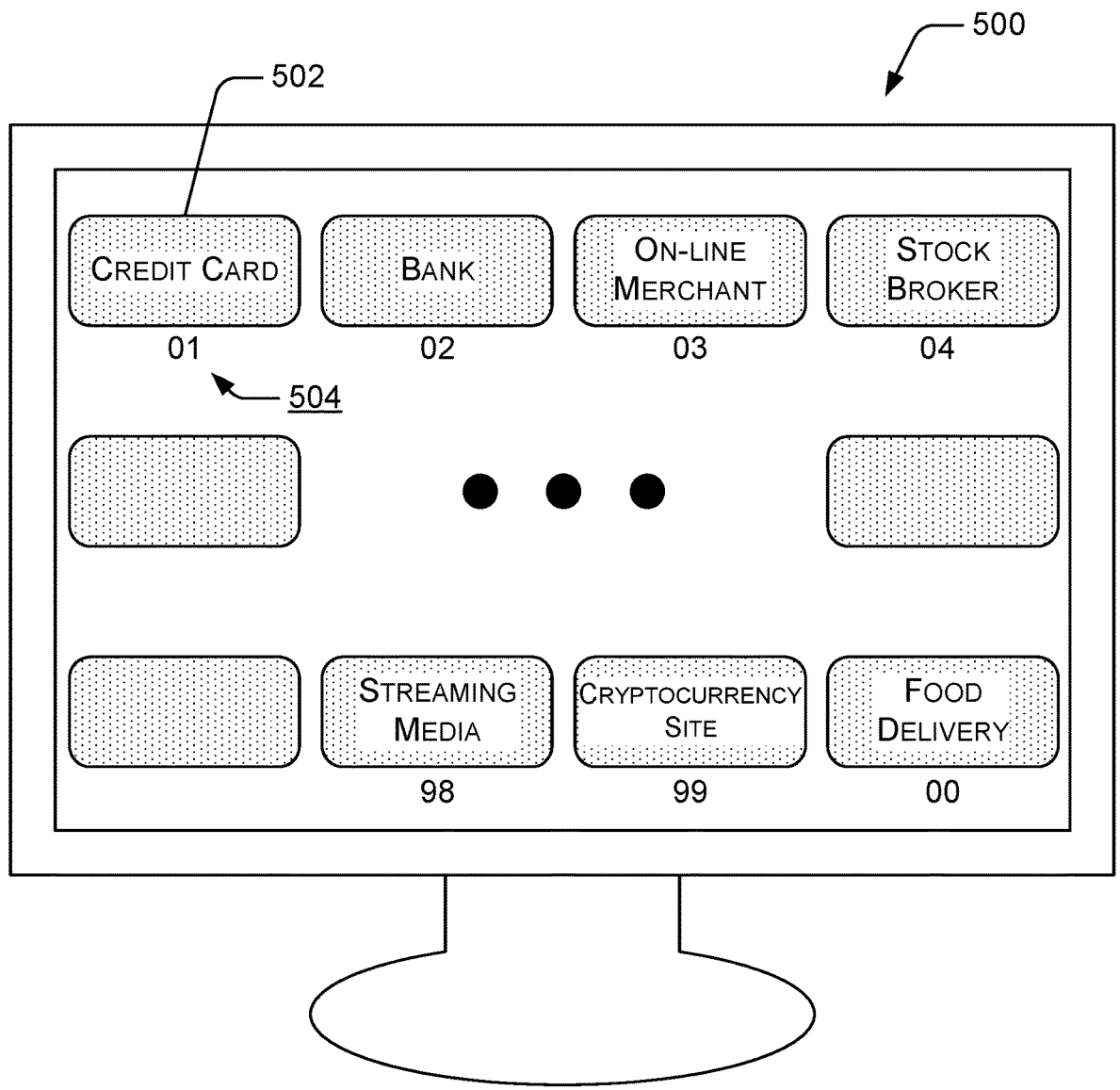
FIG. 5 is illustrative UI showing multiple icons representing links that can be accessed by a specific combination or sequence of biometric inputs.

A user interface (UI) module 414 in the server 310 may generate data that causes the server 310 or a different computing device such as, for example, computing device 118 or 304 to generate a UI. The UI may be one that a user interacts with by providing biometric data. For example, instead of pressing a key on a keyboard, touching a touchscreen, or clicking a mouse, the UI may present multiple icons that are selected or activated by providing specific biometric data. For example, a specific combination of fingerprints may be used to activate a link in the UI serving to both indicate which link the user wishes to activate and provide biometric authorization for accessing that link. One example of a UI that could be generated by the UI module 414 is shown in FIG. 5.

A stored data provision module 416 on the server 310 may provide stored data to other computing devices upon receiving biometric authorization. For example, the stored data may be passwords, credit card numbers, account numbers, or the like. The stored data provisioning module 416 may, upon receiving authorization from the biometric authorization module 312, communicate a password or other data to a different computing device such as the web server 314. Thus, in one implementation the server 310 with the stored data provisioning module 416 may serve as a unified password storage that provides the appropriate password to a website or other computing device upon receiving biometric authentication. Thus, the user does not need to remember individual passwords and all of the passwords are secured by the user's biometrics. Other computing devices such as the web server 314 that may not be able to natively implement biometric login, may use the server 310 to provide that feature. The server 310 may expose appropriate application programming interfaces (APIs) to allow other devices to access biometric login functionality available on the server 310. Software development kits (SDKs) may also be provided so that other computing devices can implement logins using biometric data. For example, on a website the user may select a login box and then provide biometric data via a biometric sensor. Authentication of the biometric data and providing authorization to element the login process may be handled by the server 310.

One way the server 310 may provide authorization to other computing devices to log into websites or access secure data is by provisioning a token. Tokens may be created and disseminated by the tokenization module 418. Tokenization, when applied to data security, is the process of substituting a sensitive data element with a non-sensitive equivalent, referred to as a token, that has no extrinsic or exploitable meaning or value. The token is a reference (i.e. identifier) that maps back to the sensitive data through a tokenization system. The mapping from original data to a token uses methods which render tokens infeasible to reverse in the absence of the tokenization system, for example using tokens created from random numbers. When tokens replace live data in systems, the result is minimized exposure of sensitive data to those applications, stores, people and processes, reducing risk of compromise or accidental exposure and unauthorized access to sensitive data.

Applications can operate using tokens instead of live data, with the exception of a small number of trusted applications explicitly permitted to detokenize when strictly necessary. Tokenization systems may be operated in-house within a secure isolated segment of the data center, or as a service from a secure service provider.

The tokenization module 418 may create a biometric token which provides evidence of the identity of the user based on biometric data evaluated by the biometric authorization module 312. The recipient of the token can recognize the authenticity of the user's identity based on the biometric identification techniques applied by the server 310. The tokenization module 418 may issue a token response to each login request submitted by a separate computing device or service provider. Thus, tokens issued by the tokenization server 310 may be used as part of a handshaking procedure that connects a computing device of the user to a separate computing device such as the web server 314. In addition to handshaking and initial connections, tokens may be provided by the tokenization module 418 to implement any command secured by biometrics. For example, logging into the website of a bank may require a first token and initiating a transfer of funds may require a second token both issued from the server 310 to the computing systems of the bank.

The role of the distributing tokens may be delegated from the server 310 to other entities or computing devices by providing a master lease. A master lease provides the right to obtain tokens from the server 310 for redistribution to other parties. A lease provides tokens to an end user for that user's use in accessing websites or other resources secured by biometric identities. Thus, tokens issued by the server 310 stand-in for the actual data files captured from a biometric sensor and allow a biometric identity to be verified and communicated across a broader range of systems and computing devices. In some implementations, an entity controlling the server 310 may charge a fee for providing tokens. For example, a single token may be made available for $\frac{1}{10,000}$ of a cent.

The server 310 can also include an alert module 420. The alert module may implement an alert based on detection of an "alert" finger. Thus, if a biometric sensor reads the fingerprint of a user's "alert" finger, once that fingerprint pattern is provided to the server 310 it may be recognized by the alert module 420 and the alert module 420 may trigger an alert condition. Triggering an alert condition may include determining a location of the biometric sensor and providing location to police or other authorities along with a message that an alert has been triggered. The alert condition may also change the behavior of the UI module 414 so that the UI displays what appears to be standard interactions between the user and the computing system but in fact is not implementing any transactions or accessing any secure data. Thus, viewers of the UI, potentially including a bad actor who is trying to force the user to access biometrically secured data, will see what appears to be normal UI interaction but in fact the underlying changes displayed on the UI will not be implemented.

If an alert condition is triggered, that condition may persist until the alert module 420 is reset and the alert condition cleared. The alert module 420 may be reset by the user entering a specific sequence of biometric data such as a particular sequence of fingerprints. In one implementation, the alert module may be reset by the user presenting identity credentials to a third party similar to how the user may initially enroll for the biometric identification service. The third party may then contact the server 310 on behalf of the user or provide the user with a temporary voucher or code that can be used to reset the alert module 420.

The server 310 may include additional modules beyond those discussed above and any of the modules discussed herein may be omitted or combined.

User Interface

FIG. 5 shows an illustrative UI 500 that may be generated by the UI module 414. The UI 500 includes a plurality of links to service providers. A link 502 may, for example, provide a link to a credit card. The service providers may be associated with financial institutions or any type of service provider that interacts with users via the Internet or other electronic communication channels. For example, service providers may include a credit card company, a bank, an online merchant, a stockbroker, a website that provide streaming media, a cryptocurrency site, or other service providers such as a website for ordering food delivery. The UI 500 may display any number of different links such as 10, 20, 50, 100, or some other number of links. In one implementation, the UI 500 may show each of the links as a text box.

Individual ones of the links may be associated with a number. An example is "01," which is the number 504 associated with link 502 The number 504 may be an integer that includes one, two, three or more digits. The UI shown in FIG. 2 presents one way of assigning numbers to individuals fingers of a user. Thus, for example a first link 502 may be accessed by the user touching the fingers corresponding to the number 0 and the number 1 to a fingerprint sensor in that order. Using the numbering shown in FIG. 2, the first link 502 would be accessed by the user presenting the fingerprint of his left thumb followed by that of his right thumb. UI 500 uses the biometric data of fingerprints to confirm the identity of a user and the choice of which biometric data is presented in order to implement a specific command such as accessing a link. In some implementations, the configuration of the UI 500 may be configured by the user and he or she may select which links are displayed in which order as well as the corresponding numbers for individual links. In other implementations, all or part of the UI 500 may be structured based on relationships between the entity controlling the server 310 and entities associated with the displayed links. One type of relationship is pay-for-placement in which a service provider may have its link presented on the UI 500 in a particular location in exchange for payment. In addition to payment, the number 504 may also be selected by the entity controlling a link potentially in exchange for payment to the entity controlling the server 310.

Illustrative Processes

The processes discussed below are each illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processing units, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
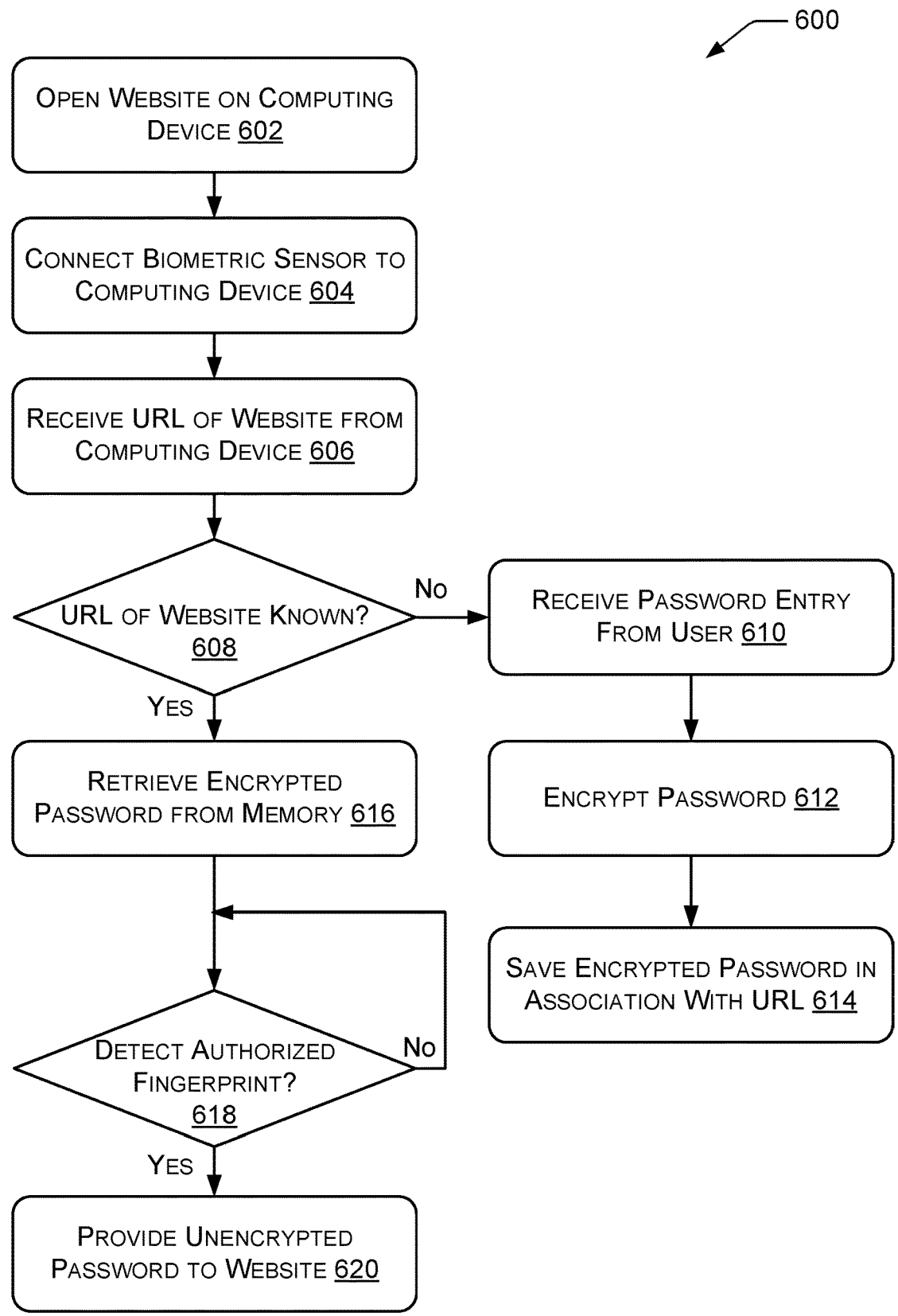
FIG. 6 is a flow diagram of an illustrative process to provide passwords to websites based on fingerprint authorization.

FIG. 6 is a flow diagram of an illustrative process 600 to retrieve passwords using biometric authentication. The process 600 may be implemented, for example, in the networked environment 300 shown in FIG. 3 with the devices shown in FIG. 1 and FIG. 3. Of course, the process 600 (and other processes described herein) may be performed in other similar and/or different environments.

At 602, a website is opened on a computing device such as any one of the computing devices 304 shown in FIG. 3. Opening a website on the computing device may include launching a web browser application running on the computing device and directing the web browser to display as the active window a webpage associated with a URL. The webpage may include a field, window, text box, or the like for entry of a value such as a password, credit card number, access code, etc.

At 604, a biometric sensor is connected to the computing device. The biometric sensor may be the same or similar to the biometric sensor 100 shown in FIG. 1 or 302 shown in FIG. 3. The connection between the biometric sensor and the computing device may be a communicative connection such as the communicative connection 306 shown in FIG. 3. The connection is a two-way connection. Both the computing device and the biometric sensor may send and receive data.

At 606, a URL of the website is received by the biometric sensor from the computing device. The URL may be a textual representation of the website currently displayed in an active window of a web browser running on the computing device.

At 608, the biometric sensor determines if the website is known. If the website is known, then the URL is stored in memory of the biometric sensor in association with a password or other value. If the website is not known because the URL of the website is not present in a lookup table or other data structure within the biometric sensor, then process 600 proceeds along the "no" path to 610.

At 610, a password entry is received from the user entering the password into the computing device and the computing device provides the password to the biometric sensor.

At 612, the password may be encrypted by the biometric sensor and stored in encrypted memory such as encrypted memory 112 shown in FIG. 1. Encryption of the password may be provided by the encryption/decryption module 122. Encryption of the password may or may not also encrypt that URL of the website.

At 614, the encrypted password is saved in association with the URL on the biometric sensor. Thus, the biometric sensor creates a record of the password in association with the URL of the website. This record may be created, for example, by the record generation module 124 shown in FIG. 1.

If, at 608, the URL website is known then process 600 proceeds along the "yes" path to 616. At 616, the encrypted password is retrieved from memory such as, for example the encrypted memory 112.

At 618, the biometric sensor determines if an authorized fingerprint is detected. The authorized fingerprint may be a fingerprint that matches a saved fingerprint of a user associated with the biometric sensor. An authorized fingerprint may be any of the user's 10 fingerprints or may only be a subset of those fingerprints such as only a single individual fingerprint. In one implementation, the authorized fingerprint may be any of nine fingerprints of the user but the tenth fingerprint may be used to trigger an alert, and thus, is not recognized as an authorized fingerprint. A fingerprint may be recognized as an authorized fingerprint by the fingerprint recognition module 120 shown in FIG. 1.

At 620, the encrypted password is provided to the website. Thus, by connecting the biometric sensor to a computing device, the user is able to use his or her fingerprint to access a password stored on the biometric sensor and provide that password to a website without needing to manually enter the password. The user does not need to remember the password and if the website is known to the biometric sensor it automatically provides the correct password when presented with an authorized fingerprint.

Figure 7A:
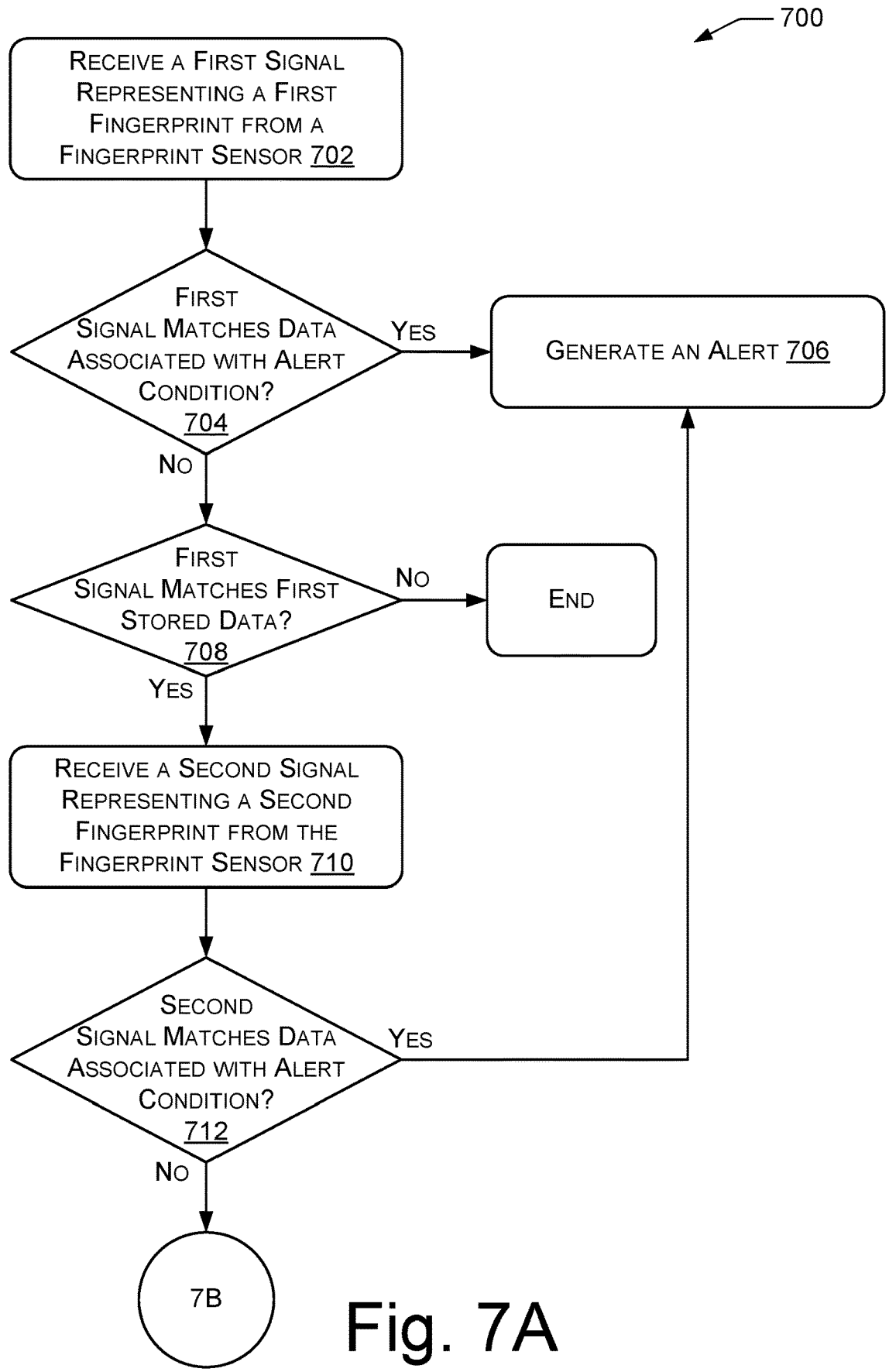
FIGS. 7A and 7B are a flow diagram of an illustrative process to generate a command based on two-factor fingerprint detection.
Figure 7B:
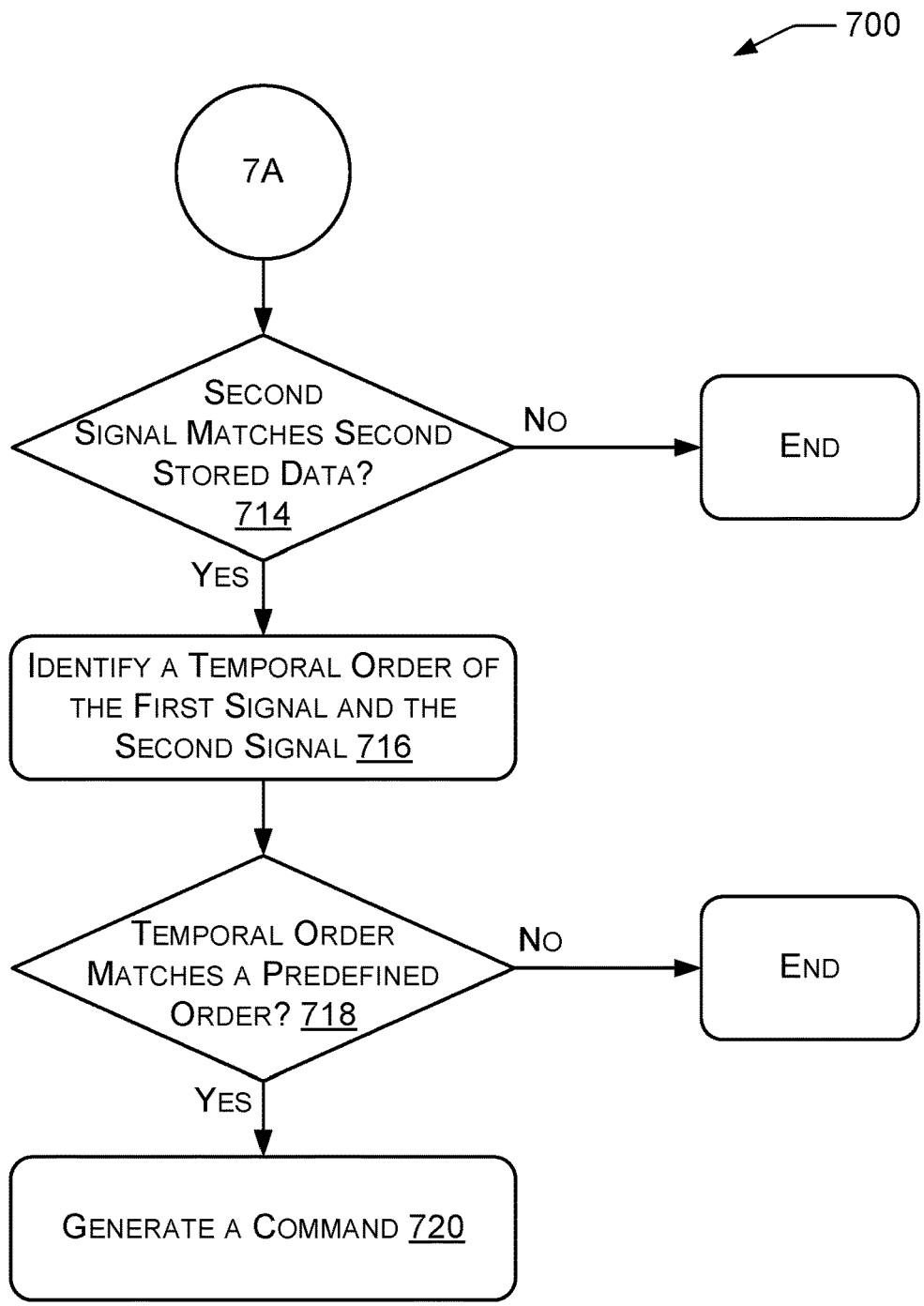

FIGS. 7A and 7B are a flow diagram of an illustrative process 700 that uses two-factor biometric identification to generate a command.

At 702, a first signal representative of a first fingerprint is received from a fingerprint sensor. The first representative signal may be a landscape of capacitance or other values generated by the fingerprint sensor. In one implementation, the first signal is a subset of the values detected by the first fingerprint sensor.

At 704, is determined if the first signal matches stored data associated with an alert condition. The stored data associated with the alert condition may be data representing one of the fingerprints of the user. Thus, if the user contacts that fingerprint to the fingerprint sensor, process 700 proceeds along the "yes" path to 706.

At 706, an alert is generated. The alert may be generated by the alert module 420 shown in FIG. 4. The alert may notify the authorities that the user seeks assistance and may prevent the system from completing any commands.

If, however, the fingerprint was not that of an "alert" finger, then process 700 proceeds along the "no" path to 708. At 708, is determined if the first signal matches first stored data. The first stored data may be a representation of one of the user's fingerprints. Determining that the first signal is a match with stored data may be performed on the biometric sensor by the fingerprint recognition module 120 shown in FIG. 1. Alternatively, this comparison may be performed on another computing device such as by the biometric authorization module 312 of the server 310.

If the signal does not match the stored data, then the fingerprint is not an authorized fingerprint and process 700 proceeds along the "no" path where the process ends and the system does not generate a command. However, if the first data does match the stored data it is determined that the fingerprint is an authorized fingerprint and then process 700 proceeds along the "yes" path to 710.

At 710, a second signal representing a second fingerprint is received from the fingerprint sensor. The second signal may be received by the same fingerprint sensor that received the first signal at 704 or by different fingerprint sensor. For example, the first signal received at 704 may be received from a first biometric sensor 202 and the second signal received at 710 may be received from a second biometric sensor 204 as shown in FIG. 2.

At 712, it is determined if the second signal matches data associated with the alert condition. For example, even if the first finger presented by the user is not the "alert" finger the user may still trigger an alert later in the process by presenting the "alert" finger. If the second signal is identified as corresponding to a fingerprint that activates alert condition, process 700 proceeds along the "yes" path to 706 where an alert is generated as described previously.

Proceeding now to FIG. 7B, at 714 is determined if the second signal matches a second stored data. Thus, it is determined if the second signal matches a second authorized fingerprint. As described above comparison of the data received from a fingerprint sensor response to sensing a fingerprint and stored data that represents an authorized fingerprint may be compared by the fingerprint recognition module 120 on the biometric sensor 100 or the biometric authorization module 312 on the server 310.

If the second signal does not match the second stored data, then process 700 proceeds along the "no" path and ends without authorizing a command. Thus, in this example two fingerprints must be presented and each must be an authorized fingerprint. In many of the implementations, the two fingerprints will correspond to different fingers of a user. It is also possible that the command is generated by presenting the same fingerprint multiple times. Furthermore, the sequence of authorized fingerprints may include fingerprints from multiple individuals. For example, a user's fingerprint and a system administrator's fingerprint may both be required to generate a command that deletes an account. Although process 700 describes only two signals, corresponding to two fingerprints, similar processes may be implemented with three or more signals.

If the second signal is determined to match the second stored data, then process 700 proceeds along the "yes" path to 716. At 716, a temporal order of the first signal and the second signal is identified. The temporal order may be the first signal preceding the second signal, the second signal preceding the first signal, or both signals being received at the same time or at substantially the same time. The temporal order may be a second factor for two-factor authentication that must also be satisfied in order to authorize implementation of the command. Thus, it is not sufficient to just present the correct fingers to the fingerprint sensor, they must also be presented in the correct order. This provides additional security because even if in a nefarious user somehow has control of an authorized user's fingerprints, the nefarious user must also have knowledge of the temporal order.

At 718, it is determined if the temporal order matches a predefined temporal order. If not, process 700 proceeds along the "no" path and ends. If the temporal order matches, then process 700 proceeds along the "yes" path to 720.

At 720, a command is generated in response to receiving the correct biometric inputs in the correct temporal order. The command may include any command conventionally implemented by computing device such as decrypting data, signaling a mechanical lock to open, etc. In some implementations, the command may be related to a software token that represents a biometric identity. The software token communicates to a recipient that the user identity represented by the software token was validated by biometric techniques. The command may include releasing the software token to another computing device. The command may also include authorizing a computing device to insert the software token into the public ledger of a blockchain file.

Account Reset

If a user loses his or her fingerprints due to an accident, it will be beneficial if there is a mechanism for regaining access to accounts and information secured by the biometric data. Resetting an account may clear the biometric authentication features from the account and return account access to the previously used techniques such as a password. In one implementation, the user's identity may be verified by a second type of biometric data. For example, the user may provide an iris scan to obtain access to stored records of his or her fingerprint scans and use the stored fingerprint scans to reset accounts.

In another implementation, the second type of biometric data may be genetic information of the user. Thus, a deoxyribose nucleotide (DNA) sequence obtained from the user such as by a cheek swab may be stored in association with a user's account. The sequence of a portion of the user's DNA may be stored electronically. It may be stored, for example, in association with the master fingerprint records 412 of the user. Alternatively, a sample of tissue from the user containing DNA such as a cheek swab may be stored and sequenced if needed to reset access to an account.

In order to provide additional security when resetting an account, the user may provide the second type of biometric data and also the second factor such as the sequence in which the fingerprints were used to log into the account. Thus, if an account storing many of the user's passwords was accessed by the user presenting the fingerprint of his right pinky, left pinky and then right middle finger he could communicate that order the server 310 or other system maintaining his master fingerprint records 412 and if that order successfully accessed his account, the account would be reset. Further security during account reset could be provided by requiring an employee of the entity maintaining the server 310 to authorize the reset.

Security

A system or computing device may be secured by limiting access to only users who have provided a valid biometric identity. This may be implemented, for example, by requiring every computing device accessing a web server to provide a biometric token with each command submitted to the web server. Thus, devices which do not provide a biometric token will not be able to access the web server and all access to the web server will be traceable to known biometric identities. This may deter hackers from attempting to access the web server because any accessory requires a token that is linked to an actual person's biometric features.

Limiting access by requiring biometric tokens for access may create a website or domain in which there is an environment where every accessing member is known. This can create a biometric-token protected network. An example of a network that may be protected by biometric tokens is a virtual private network (VPN). The VPN may be created by establishing a virtual point-to-point connection through the use of dedicated connections, virtual tunneling protocols, or traffic encryption which is based on the biometric tokens.

If a computing device that is not providing an appropriate token, attempts to access the website, web server, domain, etc. it may be forced off by sending a large amount of useless data in a low-level computer code to that computing device. For example, random commands in machine code or machine language may be sent to computing devices that do not provide the correct token. As a further example, static comprising assembly language instructions may be sent computing devices that attempt access without providing biometric authentication.

Blockchain Integration

Proof of identity through biometrics may be particular useful for blockchain or other peer-to-peer systems that function without a central authority to confirm user identities. A blockchain may include a series of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistence of the integrity codes. Proof of identities of users modifying a blockchain such as buyers or sellers of a cryptocurrency or participants in a smart contract may be recorded in the blockchain itself by addition of biometric data or by a token that represents biometric identity.

In various systems multiple parties may use a blockchain-based file or ledger to maintain a tamper-evident record of events, transactions, or other updates. In some cases, a blockchain may register tampering after a change made to the blockchain by an untrusted party, for example a party that has accessed the blockchain without providing a biometric token. Thus, the parties may individually verify that updates by other parties are valid and coding-consistent with the previous data blocks of the blockchain. The self-consistence of the integrity codes allows the updates to the blockchain to be verified even if the party lacks an archived version of the blockchain to use as a reference. When a rewrite to one or more data blocks in a blockchain does not introduce coding-inconsistency among the integrity outputs and data block contents of the blocks in the blockchain, the rewrite may be characterized as preserving the validity of the blockchain.

A blockchain may be secured by an integrity code. An integrity code may produce a particular integrity output when particular data is provided as input to the integrity code. In some cases, when data different than the particular data is provided to the integrity code as input, the integrity code may produce a different integrity output. In an example scenario, an integrity output from the integrity code generated from particular input data from a data block is stored and the data block is later changed. If the changed data is provided to the integrity code as input, the integrity code may produce an integrity output that is different or otherwise coding-inconsistent with the stored integrity output. Therefore, the change may be detected in this example scenario. The integrity code may be based in whole or in part on the representation of biometric data such as data representing the scan of a user's fingerprint or a token representing the user's biometric identity.

A blockchain may include a series of blocks where each subsequent block in the series holds the integrity output for a previous block. The series may form a chain of blocks in which each subsequent block holds an integrity output generated from the data present in the immediately prior block. Accordingly, if a block is changed, a coding-inconsistency with the integrity output stored in a subsequent block may be detected. Since the integrity outputs are part of the stored data in the blocks, changes to the integrity outputs themselves may also be detected through coding-inconsistencies. This self-consistency of the integrity code may be used to secure a blockchain with respect to covert tampering.

When secured by an integrity code, a tamper-evident change may include virtually any change for which a coding-inconsistency between the integrity outputs of the integrity code for a blockchain and the data within the blockchain can be detected. For example, the data in a block of the blockchain may be hashed, run through a checksum, or have another integrity code applied. If the data in the block is later found to conflict with the integrity output of the hash, checksum, or other integrity code, the change may be identified as tamper-evident. A conflict may occur when the data currently in a block does not produce an identical or equivalent integrity output to the earlier obtained integrity output when the integrity code is applied to the data currently in the block. When a change is made to a block and no coding-inconsistency with the previously stored integrity outputs of the integrity code can be detected afterward, that change may be non-tamper-evident. In some cases, a non-tamper-evident rewrite may be implemented by substituting a first block with a second block with different data content that produces the same (or an equivalent) integrity output.

One use of blockchains is to implement smart contracts. A smart contract may be represented as the contents of the individual records in a blockchain that can include contractual obligations or rights between the sender and the receiver. The smart contracts can be between individual users, partnerships, companies, or corporations. Confirmation of identities of participants in a smart contract may be recorded by use of biometric identifiers. For example, a token that represents a biometric identity of a party to a smart contract may be included in the blockchain that implements the smart contract. The smart contract can involve recurrent execution of software code. The software code within a smart contract can comprise software code that can be executed when certain conditions are satisfied.

One example of a system for creating blockchains for any of multiple different purposes is Ethereum. Ethereum is a distributed public blockchain network that can be used to create cryptocurrencies, smart contracts, or any other application for which a blockchain may be used. Any of the techniques described herein for implementation on blockchains may be implemented using Ethereum or other similar technology.

Illustrative Applications

The hardware and techniques described herein may be applied in many different scenarios. For example, a biometric sensor may be used to implement a physical lock for a door, a motor vehicle, a safe, etc. Using detailed capacitance readings to confirm the presence of live tissue and two-factor authentication based on the order in which fingerprints are presented increases security relative to conventional fingerprint sensors. These advantages may be implemented without a network connection solely by systems included in the biometric sensor itself.

If the biometric sensor is connected to a network, it may communicate with a server such as the server 310 introduced in FIG. 3 so that the server can provide authentication services and data associated with the account of a user. For example, an automobile or car fob implemented with a fingerprint sensor and connected to a mobile phone by Bluetooth may be used to unlock one of multiple different automobiles such as a car share vehicle. The fingerprint sensor may confirm the identity of the user operating the car fob and a server or other computing device accessed via a network connection by the mobile phone may provide payment information to the operator of the car share vehicle. This implementation is equally applicable to self-driving vehicles.

Access to medical information and medication may be controlled by biometric security as described herein. For example, medical information accessed at a medical provider's office or a prescription filled at a pharmacy may be authorized in part through the user presenting biometric data via a device such as the biometric sensor described herein.

Biometric authentication may also be used to access a brain-machine-interface (BMI). A BMI is a direct communication pathway between an enhanced or wired brain and an external device. BMI differs from neuromodulation in that it allows for bidirectional information flow. BMIs are often directed at researching, mapping, assisting, augmenting, or repairing human cognitive or sensory-motor functions. One use of BMIs may be to provide brain waves associated with positive thoughts to a user. The brain waves associate with positive thoughts may include brain waves generated when a user is in a gamma wave state. A gamma wave is a pattern of neural oscillation in humans with a frequency between 25 and 100 Hz typically around 40 Hz. A BMI device may provide signals to a user's brain that cause the brain to enter a gamma wave state. The interface between the BMI device and a user positive brain may be regulated by a biometric sensor so that the user has control over signals provided to his or her brain.

A user may cause a BMI device to generate signals that are associated with positive thoughts such as a gamma wave state in response to a particular biometric input such as a combination of fingerprints. Being able to directly control brain state may allow a user to counteract negative thoughts that are either self-created or imposed externally. One potential source of externally imposed negative thoughts may be human interaction with artificial intelligence (AI). As used herein, artificial intelligence is intelligence demonstrated by machines, in contrast to the natural intelligence displayed by humans and other animals. In computer science AI research is defined as the study of "intelligent agents": any device that perceives its environment and takes actions that maximize its chance of successfully achieving its goals.

EXAMPLE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

A: A biometric identification device comprising: a processor; a fingerprint sensor configured to generate a landscape of ridge and valley readings in response to contact of a fingerprint with the fingerprint sensor; an encrypted memory storing an encrypted value associated with a character string; a communicative connection to a computing device; and memory storing instructions that when executed by the processor cause the processor to: receive the character string; determine that the fingerprint is authorized to access the encrypted memory; decrypt the encrypted value to generate a value; and provide the value to the computing device.

B: The biometric identification device of clause A, wherein the encrypted value is an encrypted password and the character string is a universal resource locator (URL) or the encrypted value is an encrypted credit card number and the character string is a name of a credit card.

C: The biometric identification device of clause A or B, wherein the character string is the URL and receive the character string comprises receiving the URL from a web browser on the computing device via the communicative connection.

D: The biometric identification device of any of clauses A-C, further comprising: a display configured to display the character string; and an input device configured to change the character string displayed on the display.

E: The biometric identification device of clause D, wherein receive the character string comprises detect the character string displayed in the display.

F: The biometric identification device of any of clauses A-E, further comprising a second fingerprint sensor configured to generate a second landscape of ridge and valley readings in response to contact of a second fingerprint with the second fingerprint sensor simultaneous to the contact of the fingerprint with the fingerprint sensor.

G: The biometric identification device of any of clauses A-F, wherein the fingerprint sensor is a capacitive fingerprint sensor and the ridge and valley readings are capacitance readings.

H: The biometric identification device of clause G, wherein the instructions are further configured to: compare the landscape of ridge and valley capacitance readings to a known characteristic of living tissue; and determine that the fingerprint was generated by living tissue.

I: The biometric identification device of clause H, wherein the known characteristic of living tissue is based on differences in humidity and/or temperature between ridges and valleys of fingerprints.

J: A method of two-factor biometric identification comprising: receiving from one or more fingerprint sensors a first signal representing a reading of a first fingerprint and a second signal representing a reading of a second fingerprint; comparing the first signal and a first stored data; determining that the first signal matches the first stored data; comparing the second signal and a second stored data; determining that the second signal matches the second stored data; identifying a temporal order of the first signal and of the second signal; determining that the temporal order matches a predefined temporal order; and generating a command.

K: The method of clause J, wherein the first signal is received from a first fingerprint sensor and the second signal is received from a second fingerprint sensor.

L: The method of clause J or K, wherein the first fingerprint is associated with a first integer, the second fingerprint is associated with a second integer, and the command is associated with a numeric value that is the first integer followed by the second integer.

M: The method of any of clauses J-L, wherein the first signal or the second signal matches stored data associated with an alert condition and the generating the command comprises generating an alert.

N: The method of any of clauses J-M, wherein the command authorizes a computing device to release a software token.

O: The method of any of clauses J-N, wherein the command authorizes a computing device to insert a software token into a public ledger of a blockchain file.

P: A system comprising: one or more processors; a memory; master fingerprint records containing representations of a plurality of fingerprint patterns; a user interface module configured to generate instructions for a user interface that includes links to a plurality of service providers, each link associated with a combination of two or more different fingerprint patterns; a fingerprint encryption/decryption module configured to decrypt encrypted data representing a first fingerprint pattern and a second fingerprint pattern to generate an unencrypted first fingerprint pattern and an unencrypted second fingerprint pattern; a biometric authorization module configured to match the first unencrypted fingerprint pattern to a first saved fingerprint pattern in the master fingerprint records, match the second unencrypted fingerprint pattern to a second saved fingerprint pattern in the master fingerprint records, and; and generate a command to access a one of the links associated with a one of the plurality of service providers, the one of the links selected based on an order of the first fingerprint pattern and the second fingerprint pattern.

Q: The system of clause P, wherein the master fingerprint records contains, for a user, data representing ten fingerprint patterns corresponding to ten fingers of the user.

R: The system of clause P or Q, wherein the biometric authorization module is further configured to determine an identity of a user based on the first fingerprint pattern and the second fingerprint pattern, wherein the identity is a public identity associated with one or more publicly known characteristics of the user, or wherein the identity is an anonymous identity that is not associated with a publicly known characteristic of a user but is associated with one or more electronic accounts.

S: The system of clause R, wherein the fingerprint encryption/decryption module is further configured to decrypt the encrypted data representing the first fingerprint pattern by using a synthetically generated arbitrary fingerprint pattern associated with the identity of the user.

T: The system of any of clauses P-S, further comprising a tokenization module configured to provide a biometric token to the one of the plurality of service providers, the biometric token providing evidence of an identity of a user based on the first fingerprint pattern and the second fingerprint pattern.

CONCLUSION

The terms "a," "an," "the" and similar referents used in the context of describing the invention (especially in the context of the following claims) are to be construed to cover both the singular and the plural, unless otherwise indicated herein or clearly contradicted by context. The term "based on" is to be construed to cover both exclusive and nonexclusive relationships. For example, "A is based on B" means that A is based at least in part on B and may be based wholly on B. By "about" is meant a quantity, level, value, number, frequency, percentage, dimension, size, amount, weight, or length that varies by as much as 10, 9, 8, 7, 6, 5, 4, 3, 2, or 1% to a reference quantity, level, value, number, frequency, percentage, dimension, size, amount, weight, or length.

All methods described herein can be performed in any suitable order unless otherwise indicated herein or otherwise clearly contradicted by context. The use of all examples and exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified, thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

APPENDIX A

For measuring resistance and capacitance in living bodies there exists a method in which a finite alternating current is applied, and the resistance and capacitance are found from changes in the amplitude and phase angle of the passing potential. With this method, moreover, the resistance and capacitance are found for transient and constant states and values thereof are obtained at each frequency. The transient state includes a transcendental function which has exponential terms which merely become zero in the constant state, so it is possible to obtain all states using the computer program which solves the transient state. The finite alternating current was applied to human skin for three cycles, and the resistance and capacitance thereof was measured for each frequency.

I. General Discussion

There exist methods using direct current and alternating current to measure the electrical resistance and capacitance of human skin. In methods using alternating current, measurement has generally been carried out using an alternating current bridge.

Two branches of the bridge are coupled in series with resistors $R_1$ and $R_2$, one of the branches is coupled in series with a resistor $r_1$ and a capacitor $c_1$, while the living body is used in the fourth branch, coupled in series with a resistor $r_2$ and a capacitor $c_2$. If the impedances of the branches are $z_1$, $z_2$, $z_3$, and $z_4$, then $$\frac{z_1}{z_2} = \frac{z_3}{z_4}$$

holds when they are in a balanced state. Therefore, $$z_1 = R_1$$
$$z_2 = R_2$$
$$z_3 = r_1 + \frac{1}{j\omega c_1}$$
$$z_4 = r_2 + \frac{1}{j\omega c_2}$$
$$\frac{R_1}{R_2} = \frac{r_1}{r_2}$$
$$\frac{R_1}{R_2} = \frac{c_2}{c_1}$$

From this,

In contrast to this method, if alternating current Em sin (ωt+φ) (where Em is the amplitude of the alternating current and ω is the angular frequency) is applied to the resistors r and the capacitors c, guiding the passing potential to the measurement device of the input resistance R, with the current and potential arising therein being I and v, then $$E_m \sin \omega t = (R+r)i + \frac{1}{c}\int i\,dt$$

$$\omega E_m \cos \omega t = (R+r)\frac{di}{dt} + \frac{i}{c}$$

When $$\frac{di}{dt} = 0,$$

if i is $i_m$, v is $v_m$, and t is $t_m$, then $$\omega E_m \cos \omega t_m = \frac{i_m}{c}$$

$$i_m = \frac{v_m}{R}$$

From this, $$c = \frac{v_m}{\omega R E_m \cos \omega t_m}$$

Or from $$(R+r)\frac{v}{R} + \frac{1}{Rc}\int v\,dt = E_m \sin \omega t$$

$$v = V_m\left\{\sin(\omega t + \phi) - \sin\phi \varepsilon^{-\frac{t}{(R+r)c}}\right\}$$

Here, $V_m = \dfrac{RE_m}{\sqrt{(R+r)^2 + \left(\dfrac{1}{\omega c}\right)^2}}$ $$= \frac{RE_m}{R+r}\cos\phi$$

$$\tan\phi = \frac{1}{\omega(R+r)c}$$

and if $\dfrac{dv}{dt} = 0$, then, $$\cos(\omega t_m + \phi) + \sin\phi \tan\phi \varepsilon^{-\omega t_m \tan\phi} = 0$$

and if from this tan φ=x, then, $$x \sin \omega t_m - \cos \omega t_m = x^2 \varepsilon^{-\omega t_m x}$$

and a computer may be used to find x from ω and $t_m$, then $$\tan\phi = \frac{1}{\omega(R+r)c}$$

r can be obtained from c which was obtained from ω, R, $E_m$, $V_m$, and ω and $t_m$. In other words, this is the resistance and capacitance of the living body in a transient state.

In contrast, the resistance and capacitance in a constant state are obtained as follows. Since the constant state is t≈∞, $$v = V_m \sin(\omega t + \phi)$$

follows from $$v = V_m\left\{\sin(\omega t + \phi) - \sin\phi \varepsilon^{-\frac{t}{(R+r)c}}\right\}$$

Because the value of the positive pole sin (ωt+φ)=1, $$v = V_m$$

$$= \frac{RE_m}{R+r}\cos\phi$$

At maximum, $$\sin(\omega t + \phi) = 1$$

$$\omega t + \phi = \frac{n\pi}{2}$$

Furthermore, when $E_m \sin \omega t = E_m$, $$\omega t = \frac{n\pi}{2}$$

Hence, the phase difference between $V_m$ and $E_m$ is φ, and by finding r from the values of φ and $V_m$, $$\tan\phi = \frac{1}{\omega(R+r)c}$$

From this c is obtained.

When these two are compared, however, the latter only applies to the constant state, and is obviously unable to handle transient states. The former is an equation originally developed to solve transient states, but this case includes t both as a limit and as infinity, so it can solve cases where t is infinity. Since t can be any value, it is conceivable that an answer can be obtained for transient states as well as constant states.

Thus, a finite alternating was applied current to human skin and found r and c at the maxima of each. Transience occurred during one cycle, but for three cycles there was almost always a constant state, slight transience being included in two cycles.

II. Methodology

1. Circuit: A finite alternating current oscillator, human skin, and a measuring device were coupled in series.

2. Finite alternating current oscillator: The oscillator was designed to output a sine wave using a function generator for only the desired number of cycles between one and 20 cycles. The amplitude and angular frequency can be controlled, and a delay device is also provided.

3. Electrodes: Silver wires having a diameter of 0.8 mm were soldered to silver plates 10 mm in diameter and 0.3 mm thick, and silver chloride was used for the surfaces. These electrodes were affixed 40 mm apart on a box-shaped device made out of plastic having a length of 40 mm, a width of 100 mm, and a height of 30 mm. This was electrified via a 3% Ringer's solution agar on the skin of the back of the subject's forearm.

4. Measurement device: The measurement device used digital memory, with one word being from 50 ns to 1 s, and comprised two channels with 1024 words. Observation was done using an oscilloscope, photographs were taken, and values were recorded for analysis using a printer.

III. Results

The experiment was conducted by placing the 10-mm-radius Ag—AgCl electrodes on the back of the human subject's forearm and applying three cycles of the finite alternating current via the Ringer's solution agar. The passing potential was measured as an input resistance of 5 KΩ. The applied potential and the passing potential were input into channels 1 and 2 of the same digital memory and were both printed using photographs and the printer.

The amplitude $E_m$ and the angular frequency $\omega$ were calculated using the applied potential of channel 1. The maxima $v_1$, $v_2$, $v_3$, $v_4$, $v_5$, and vs were measured using channel 2 and the times $t_1$, $t_2$, $t_3$, ta, $t_5$, and is thereof were found.

1. w=1 ms

The w here is a word in the digital memory. e=2 V is the full-scale sensitivity of channel 1, and v=0.2 V is the full-scale sensitivity of channel 1.

$E_m$=1.46 (V)

$\omega$=2.78×10 (rad/s)

IV. Observations

From the results, the resistance and capacitance at all maxima were found when a current was running.

$$v = V_m \left\{ \sin(\omega t + \phi) - \sin\phi \varepsilon^{-\frac{t}{(R+r)c}} \right\}$$

In order to analyze the maxima using this, $f = \sin \omega t_m - x \cos \omega t_m$ $g = x^2 \varepsilon^{-\omega t_m x}$ When a particular value $x_1$ is put in,
f>g
or
f<g
From this, $$x_2 = x_1 + \frac{x_1}{m}$$

Resulting in f>g
or
fig
When that happens, then $$x_3 = x_2 + \frac{x_2}{m}$$

When this is repeated, x is found such that f≈g.

This x is $$\tan\phi = \frac{1}{\omega(R+r)c}$$

And with that and $$c = \frac{V_m}{\omega R E_m \cos \omega t_m}$$

r and c are found. However, the computer includes a program such that when $\omega$, $E_m$, $v_m$, and $t_m$, are input, r and c and ½ ωc are output. In the constant state, therefore, r and c are found using the same program when t≈∞, so the values of r and c are output no matter the state, by inputting the values obtained from the experiment as-is into the computer.

Hence, r and c are found from the results and the values thereof can be used to find changes therein when transitioning from a transient state to a constant state.

Thus, all resistance and capacitance values were obtained at maxima for each word. In past research on alternating current in human skin, Motokawa et al. have found an impedance diagram using alternating current bridges on the human scalp, but that was a constant state, since the values were found using the alternating current bridge in a balanced state.

Many things can be derived from the present study, and not just an impedance diagram. Let us mention on two or three.

The value of the first maximum in each word ($t_1$ in the experiment results) is clearly a transient state and differs from later values. The question is then whether there is some law governing how those values grow to the maximum as the time value grows, and while some type of relationship is conceivable, it does not apply to all words. The value at the first $t_1$ clearly differs from later values. Almost all values grow in the resistance, and the same tendency is seen in the capacitance.

However, when the second or third changes, the seize relationship is not necessarily consistent. There are many cases where there is a tendency for the first and second to grow, but for $t_3$, $t_4$, $t_5$, and $t_6$, to approach a fixed value in terms of oscillation, but there are also cases which diverge from this.

The impedance diagrams experiment involves both constant and transient states, like past experiments.

The inductance also rises as the resistance rises but falls in greatest proximity, so there appears to be a tendency to create an arc, although no notable tendency.

There is other research relating to direct current in human skin. Gildmeister thought the action of resistance and capacitance was a counter electromotive force. Einthoven was the first to use a saiten galvanometer to ascertain the path of the current rather accurately, while Hozawa found this down to 2 µs using a Pendel and Balistik Galvanometer.

Following this research using direct current, there was current using alternating current on muscles and nerves, measurement being conducted using alternating current bridges. There are many errors in measurement methods using bridges with alternating current, so methods were developed where a finite alternating current was applied and the applied potential thereof and the passing potential of the living body are used to measure the resistance and capacitance thereof mainly using changes in the amplitude and deviation of the phase angle. These methods made it possible to measure the resistance and capacitance of alternating current transient phenomena which could not be measured using an alternating current bridge. Starting from the theoretical basis that computer analysis could be applied to a constant state as well, the present research applied this to human skin, and the expected results were obtained. These have been reported herein.

V. Conclusion

Direct current and alternating current have been used in measuring the resistance and capacitance of human skin, alternating currents conventionally having been used in the case of alternating current, involving the second branch to which a known resistance is input, using a variable series resistance and capacitance for the third branch, and the living body for the fourth branch to find the resistance and capacitance of the living body from the balanced state thereof. This is the constant state.

In contrast, a method has been developed for finding the resistance and capacitance of a living body by applying a finite alternating current and looking at the amplitude and phase angle thereof. In this case, both transient state and constant state phenomena are obtained, and by solving a transcendental function equation including an exponential function, a computer can be used to find the resistance and capacitance of transient states. In contrast, the exponential term in the constant state is zero, resulting in an algebraic equation, which can be solved using a usual method. Even if a large time value presenting a constant state is put into the transient state equation, the computer can find the value by using the same method.

Therefore, three cycles presenting a constant state were applied to human skin, and the computer was used to find all the resistances and capacitances of the transient and constant states from the six maxima.

What is claimed is:

1. A biometric identification device comprising:
   a processor;
   a fingerprint sensor configured to generate a landscape of ridge and valley readings in response to contact of a fingerprint with the fingerprint sensor;
   an encrypted memory storing an encrypted value associated with a character string;
   a communicative connection to a computing device; and
   a first memory being different from the encrypted memory and configured to store non-secure information, the first memory storing instructions that, when executed by the processor, cause the processor to:
     store the character string in the first memory in association with the encrypted value in the encrypted memory, the character string in the first memory having a pointer to a location storing the encrypted value in the encrypted memory;
     receive the character string from the computing device before authenticating the fingerprint;
     determine that the fingerprint is authorized to access the encrypted memory;
     identify the encrypted value based at least in part on the character string and the pointer in the first memory;
     decrypt the encrypted value to generate a value; and
     provide the generated value to the computing device.

2. The biometric identification device of claim 1, wherein the encrypted value is an encrypted password when the character string is a universal resource locator (URL), or the encrypted value is an encrypted credit card number when the character string is a name of a credit card.

3. The biometric identification device of claim 1, wherein the character string is a universal resource locator (URL), and receiving the character string comprises receiving the URL from a web browser on the computing device via the communicative connection.

4. The biometric identification device of claim 1, further comprising:
   a display configured to display the character string; and
   an input device configured to change the character string displayed on the display.

5. The biometric identification device of claim 4, wherein receiving the character string comprises detecting the character string displayed in the display.

6. The biometric identification device of claim 1, further comprising a second fingerprint sensor configured to generate a second landscape of ridge and valley readings in response to contact of a second fingerprint with the second fingerprint sensor simultaneous to the contact of the fingerprint with the fingerprint sensor.

7. The biometric identification device of claim 1, wherein the fingerprint sensor is a capacitive fingerprint sensor and the ridge and valley readings are capacitance readings.

8. The biometric identification device of claim 7, wherein the instructions are further configured to:
   compare the landscape of ridge and valley readings to a known characteristic of a living tissue; and
   determine that the fingerprint was generated by the living tissue.

9. The biometric identification device of claim 8, wherein the known characteristic of the living tissue is based on differences in humidity and/or temperature between ridges and valleys of fingerprints.

10. A method comprising:
    generating, by a fingerprint sensor, a landscape of ridge and valley readings in response to contact of a fingerprint with the fingerprint sensor;
    storing an encrypted value associated with a character string in an encrypted memory;
    storing the character string in a first memory in association with the encrypted value in the encrypted memory, the character string in the first memory having a pointer to a location storing the encrypted value in the encrypted memory, and the first memory being different from the encrypted memory and configured to store non-secure information;
    receiving the character string from the computing device through a communicative connection before authenticating the fingerprint;
    determining that the fingerprint is authorized to access the encrypted memory;
    identifying the encrypted value based at least in part on the character string and the pointer in the first memory;
    decrypting the encrypted value to generate a value; and
    providing the generated value to the computing device.

11. The method of claim 10, wherein the encrypted value is an encrypted password when the character string is a universal resource locator (URL), or the encrypted value is an encrypted credit card number when the character string is a name of a credit card.

12. The method of claim 10, wherein the character string is a universal resource locator (URL), and receiving the character string comprises receiving the URL from a web browser on the computing device via the communicative connection.

13. The method of claim 10, further comprising:
a display configured to display the character string; and
an input device configured to change the character string displayed on the display.

14. The method of claim 13, wherein receiving the character string comprises detecting the character string displayed in the display.

15. The method of claim 10, further comprising: a second fingerprint sensor configured to generate a second landscape of ridge and valley readings in response to contact of a second fingerprint with the second fingerprint sensor simultaneous to the contact of the fingerprint with the fingerprint sensor.

16. The method of claim 10, wherein the fingerprint sensor is a capacitive fingerprint sensor and the ridge and valley readings are capacitance readings.

17. The method of claim 16, further comprising:
comparing the landscape of ridge and valley readings to a known characteristic of a living tissue; and
determining that the fingerprint was generated by the living tissue.

18. The method of claim 17, wherein the known characteristic of the living tissue is based on differences in humidity and/or temperature between ridges and valleys of fingerprints.

19. One or more computer readable media storing executable instructions that, when executed by one or more processors, cause the one or more processors to perform acts comprising:
causing a fingerprint sensor to generate a landscape of ridge and valley readings in response to contact of a fingerprint with the fingerprint sensor;
storing an encrypted value associated with a character string in an encrypted memory;
storing the character string in a first memory in association with the encrypted value in the encrypted memory, the character string in the first memory having a pointer to a location storing the encrypted value in the encrypted memory, and the first memory being different from the encrypted memory and configured to store non-secure information;
receiving the character string from the computing device through a communicative connection before authenticating the fingerprint;
determining that the fingerprint is authorized to access the encrypted memory;
identifying the encrypted value based at least in part on the character string and the pointer in the first memory;
decrypting the encrypted value to generate a value; and
providing the generated value to the computing device.

20. The one or more computer readable media of claim 19, the acts further comprising:
comparing the landscape of ridge and valley readings to a known characteristic of a living tissue; and
determining that the fingerprint was generated by the living tissue, wherein the known characteristic of the living tissue is based on differences in humidity and/or temperature between ridges and valleys of fingerprints.

* * * * *